US008835342B2

(12) United States Patent
Ying et al.

(10) Patent No.: US 8,835,342 B2
(45) Date of Patent: *Sep. 16, 2014

(54) MESOSTRUCTURED ZEOLITIC MATERIALS AND METHODS OF MAKING AND USING THE SAME

(75) Inventors: Jackie Y Ying, Winchester, MA (US); Javier Garcia-Martinez, Alicante (ES)

(73) Assignee: Massachusetts Institute of Technology, Cambridge, MA (US)

( * ) Notice: Subject to any disclaimer, the term of this patent is extended or adjusted under 35 U.S.C. 154(b) by 937 days.

This patent is subject to a terminal disclaimer.

(21) Appl. No.: 11/578,877

(22) PCT Filed: Apr. 22, 2005

(86) PCT No.: PCT/US2005/014129
§ 371 (c)(1), (2), (4) Date: Oct. 20, 2006

(87) PCT Pub. No.: WO2006/038912
PCT Pub. Date: Apr. 13, 2006

(65) Prior Publication Data
US 2007/0244347 A1 Oct. 18, 2007

Related U.S. Application Data

(63) Continuation-in-part of application No. 10/830,714, filed on Apr. 23, 2004, now Pat. No. 7,589,041.

(51) Int. Cl.
*B01J 29/06* (2006.01)
*C01B 39/00* (2006.01)

(52) U.S. Cl.
USPC ........... 502/63; 502/64; 502/67; 502/69; 502/79; 423/700; 423/712; 423/716; 423/717

(58) Field of Classification Search
USPC ........... 502/63, 64, 67, 69, 79; 423/700, 712, 423/716, 717
See application file for complete search history.

(56) References Cited

U.S. PATENT DOCUMENTS

| | | |
|---|---|---|
| 3,709,853 A | 1/1973 | Karapinka |
| 3,864,280 A | 2/1975 | Schneider |
| 4,016,218 A | 4/1977 | Haag et al. |
| 4,088,671 A | 5/1978 | Kobylinski |
| 4,564,207 A | 1/1986 | Russ et al. |
| 4,637,623 A | 1/1987 | Bubik |
| 4,689,314 A | 8/1987 | Martinez et al. |
| 4,704,375 A | 11/1987 | Martinez et al. |
| 4,816,135 A | 3/1989 | Martinez et al. |
| 4,836,737 A | 6/1989 | Holmes et al. |
| 4,857,494 A | 8/1989 | Martinez et al. |
| 4,891,458 A | 1/1990 | Innes et al. |
| 4,894,354 A | 1/1990 | Martinez et al. |
| 4,968,405 A | 11/1990 | Wachter |
| 5,013,699 A | 5/1991 | Vassilakis et al. |
| 5,051,385 A | 9/1991 | Wachter |
| 5,061,147 A | 10/1991 | Nespor |
| 5,095,169 A | 3/1992 | Skeels et al. |
| 5,116,794 A | 5/1992 | Skeels et al. |
| 5,134,242 A | 7/1992 | Le et al. |
| 5,134,243 A | 7/1992 | Bhore et al. |
| 5,160,033 A | 11/1992 | Vassilakis et al. |
| 5,200,058 A | 4/1993 | Beck et al. |
| 5,207,892 A | 5/1993 | Vassilakis et al. |
| 5,208,197 A | 5/1993 | Vassilakis et al. |
| 5,221,648 A | 6/1993 | Wachter |
| 5,232,580 A | 8/1993 | Le et al. |
| 5,254,327 A | 10/1993 | Martinez et al. |
| 5,256,277 A | 10/1993 | Del Rossi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,393,718 A | 2/1995 | Skeels et al. |
| 5,401,384 A | 3/1995 | Martinez et al. |
| 5,458,929 A | 10/1995 | Earls et al. |
| 5,510,431 A | 4/1996 | Earls et al. |
| 5,538,710 A | 7/1996 | Guo et al. |
| 5,601,798 A | 2/1997 | Cooper et al. |
| 5,614,453 A | 3/1997 | Occelli |
| 5,628,978 A | 5/1997 | Tejada et al. |

(Continued)

FOREIGN PATENT DOCUMENTS

| | | |
|---|---|---|
| FR | 2802120 | 6/2001 |
| JP | 2004-143026 | 5/2005 |
| WO | 01/17901 | 3/2001 |
| WO | 01/38223 | 5/2001 |
| WO | 2006/031259 | 3/2006 |
| WO | 2006/038912 | 4/2006 |

OTHER PUBLICATIONS

Prokesova, et al., "Preparation of nanosized micro/mesoporous composites via simultaneous synthesis of Beta/MCM-48 phases", Microporous and Mesoporous Materials 64 (2003) p. 165-174, no month.

Verhoef, et al., "Partial Transformation of MCM-41 Material into Zeolites: Formation of Nanosized MFI Type Crystallites", Chemical Materials, 2001, vol. 13, p. 683-687, no month.

Zhang et al., "Mesoporous Aluminosilicates with Ordered Hexagonal Structure, Strong Acidity and Extraordinary Hydrothermal Stability at High Temperatures", J. of the American Chem. Society, 2001, vol. 123, p. 5014-5021, no month.

(Continued)

*Primary Examiner* — Elizabeth Wood
(74) *Attorney, Agent, or Firm* — Hovey Williams LLP

(57) ABSTRACT

One aspect of the present invention relates to mesostructured zeolites. The invention also relates to a method of preparing mesostructured zeolites, as well as using them as cracking catalysts for organic compounds and degradation catalysts for polymers.

56 Claims, 26 Drawing Sheets

(56) References Cited

U.S. PATENT DOCUMENTS

| | | |
|---|---|---|
| 5,659,099 A | 8/1997 | Skeels et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,770,040 A | 6/1998 | Tejada et al. |
| 5,785,946 A | 7/1998 | Pinnavaia et al. |
| 5,786,294 A | 7/1998 | Sachtler et al. |
| 5,795,559 A | 8/1998 | Pinnavaia et al. |
| 5,800,800 A | 9/1998 | Pinnavaia et al. |
| 5,840,264 A | 11/1998 | Pinnavaia et al. |
| 5,840,271 A | 11/1998 | Carrazza et al. |
| 5,849,258 A | 12/1998 | Lujano et al. |
| 5,855,864 A | 1/1999 | Pinnavaia et al. |
| 5,858,457 A | 1/1999 | Brinker et al. |
| 5,892,080 A | 4/1999 | Alberti et al. |
| 5,902,564 A | 5/1999 | Lujano et al. |
| 5,952,257 A | 9/1999 | Tejada et al. |
| 5,958,367 A | 9/1999 | Ying et al. |
| 5,958,624 A | 9/1999 | Frech et al. |
| 5,961,817 A | 10/1999 | Wachter et al. |
| 5,985,356 A | 11/1999 | Schultz et al. |
| 5,993,768 A | 11/1999 | Zappelli et al. |
| 6,004,617 A | 12/1999 | Schultz et al. |
| 6,015,485 A | 1/2000 | Shukis et al. |
| 6,022,471 A | 2/2000 | Wachter et al. |
| 6,027,706 A | 2/2000 | Pinnavaia et al. |
| 6,096,828 A | 8/2000 | DePorter et al. |
| 6,106,802 A | 8/2000 | Lujano et al. |
| 6,139,721 A | 10/2000 | Baldiraghi et al. |
| 6,162,414 A | 12/2000 | Pinnavaia et al. |
| 6,193,943 B1 | 2/2001 | Pinnavaia et al. |
| 6,204,424 B1 | 3/2001 | Yadav et al. |
| 6,299,855 B1 | 10/2001 | Lujano et al. |
| 6,319,872 B1 | 11/2001 | Manzer et al. |
| 6,334,988 B1 | 1/2002 | Gallis et al. |
| 6,391,278 B1 | 5/2002 | Pinnavaia et al. |
| 6,410,473 B1 | 6/2002 | Pinnavaia et al. |
| 6,413,489 B1 | 7/2002 | Ying et al. |
| 6,413,902 B1 | 7/2002 | Pinnavaia et al. |
| 6,419,820 B1 | 7/2002 | Bogdan et al. |
| 6,476,085 B2 | 11/2002 | Manzer et al. |
| 6,476,275 B2 | 11/2002 | Schmidt et al. |
| 6,485,702 B1 | 11/2002 | Lujano et al. |
| 6,489,168 B1 | 12/2002 | Wang et al. |
| 6,495,487 B1 | 12/2002 | Bogdan |
| 6,524,470 B1 | 2/2003 | Kasztelan et al. |
| 6,538,169 B1 | 3/2003 | Pittman et al. |
| 6,544,923 B1 | 4/2003 | Ying et al. |
| 6,548,440 B1 | 4/2003 | Pham et al. |
| 6,558,647 B2 | 5/2003 | Lacombe et al. |
| 6,580,003 B2 | 6/2003 | Deng et al. |
| 6,583,186 B2 | 6/2003 | Moore, Jr. |
| 6,585,952 B1 | 7/2003 | Pinnavaia et al. |
| 6,592,764 B1 | 7/2003 | Stucky et al. |
| 6,620,402 B2 | 9/2003 | Jacobsen et al. |
| 6,623,967 B1 | 9/2003 | Willson, III |
| 6,649,413 B1 | 11/2003 | Schultz et al. |
| 6,669,924 B1 | 12/2003 | Kaliaguine et al. |
| 6,702,993 B2 | 3/2004 | Pinnavaia et al. |
| 6,706,169 B2 | 3/2004 | Pinnavaia et al. |
| 6,706,659 B2 | 3/2004 | Gillespie et al. |
| 6,710,003 B2 | 3/2004 | Jan et al. |
| 6,746,659 B2 | 6/2004 | Pinnavaia et al. |
| 6,756,515 B2 | 6/2004 | Rende et al. |
| 6,762,143 B2 | 7/2004 | Shan et al. |
| 6,770,258 B2 | 8/2004 | Pinnavaia et al. |
| 6,793,911 B2 | 9/2004 | Koegler et al. |
| 6,797,153 B1 | 9/2004 | Fukuyama et al. |
| 6,797,155 B1 | 9/2004 | Chester et al. |
| 6,800,266 B2 | 10/2004 | Pinnavaia et al. |
| 6,809,061 B2 | 10/2004 | Bogdan et al. |
| 6,811,684 B2 | 11/2004 | Mohr et al. |
| 6,814,943 B2 | 11/2004 | Radcliffe et al. |
| 6,818,589 B1 | 11/2004 | Gillespie |
| 6,841,143 B2 | 1/2005 | Inagaki et al. |
| 6,843,906 B1 | 1/2005 | Eng |
| 6,843,977 B2 | 1/2005 | Pinnavaia et al. |
| 6,846,546 B2 | 1/2005 | Kuroda et al. |
| 6,866,925 B1 | 3/2005 | Chane-Ching |
| 6,869,906 B2 | 3/2005 | Pinnavaia et al. |
| 6,998,104 B2 | 2/2006 | Tao et al. |
| 7,589,041 B2 * | 9/2009 | Ying et al. ............... 502/64 |
| 2001/0031241 A1 | 10/2001 | Lacombe et al. |
| 2001/0042440 A1 | 11/2001 | Miyazawa et al. |
| 2002/0018747 A1 * | 2/2002 | Pinnavaia et al. ............. 423/702 |
| 2002/0131930 A1 | 9/2002 | Pinnavaia et al. |
| 2003/0054954 A1 | 3/2003 | Chane-Ching et al. |
| 2004/0067842 A1 | 4/2004 | Pinnavaia et al. |
| 2004/0138051 A1 | 7/2004 | Shan et al. |
| 2004/0179996 A1 | 9/2004 | Shan et al. |
| 2005/0074396 A1 | 4/2005 | Takahashi et al. |
| 2006/0078487 A1 | 4/2006 | Endo et al. |

OTHER PUBLICATIONS

"CSIC NM014-Method of Preparation of Mesoporous Alumina with High Thermal Stability," http://www.serina.es/escaparate/verproducto.cgi?idproducto=4980&refcompra=NULO, downloaded Jan. 13, 2006, 2 pgs.

González-Peña, V. et al., "Thermally Stable Mesoporous Alumina Synthesized with Non-ionic Surfaces in the Presence of Amines," *Microporous and Mesoporous Materials*, 44-45, pp. 203-210 (2001).

Lyons, D.M. et al.,"Preparation of Ordered Mesoporous Ceria with Enhanced Thermal Stability," *The Journal of Materials Chemistry*, vol. 12, pp. 1207-1212 (2002).

"Materials Science: On the Synthesis of Zeolites," *Science Week*, downloaded from http://www.scienceweek.com/2003/sa031031-1.htm on Apr. 23, 2005, 5 pgs.

Scherzer, J., "Octane-Enhancing Zeolitic FCC Catalysts—Scientific and Technical Aspects," *Marcel Dekker, Inc.*, 42 pgs. (1990).

Tao et al., "Mesopore-Modified Zeolites: Preparation, Characterization, and Applications," *Chem. Rev.*, vol. 106, pp. 896-910 (2006).

Triantafyllidis et al., "Gas-oil Cracking Activity of Hydrothermally Stable Aluminosilicate Mesostructures (MSU-S) Assembled from Zeolite Seeds: Effect of the Type of Framework Structure and Porosity," *Catalyst Today*, vol. 112, pp. 33-36 (2006).

Al-Khattaf, S. et al., "The Role of Diffusion in Alkyl-Benzenes Catalytic Cracking," *Appl. Catal. A: Gen.*, 226:139-153 (2002).

Bagri, R. et al., "Catalytic Pyrolysis of Polyethylene," *Anal. Pyrolysis*, 63:29-41 (2002).

Corma, A., "From Microporous to Mesoporous Molecular Sieve Materials and Their Use in Catalysis," *Chem. Rev.*, 97:2373-2419 (1997).

"CSIC NM014-Method of Preparation of Mesoporous Alumina with High Thermal Stability," http://www.serina.es/escaparate/verproducto.cgi?idproducto=4980&refcompra=NULO, downloaded May 9, 2007, 2 pgs.

Davis, M.E., "Ordered Porous Materials for Emerging Applications," *Nature*, 417:813-821 (2002).

Davis, M.E., "Zeolite and Molecular Sieve Synthesis," *Chem. Mater.*, 4:756-768 (1992).

de Moor, P-P.E.A. et al., "Imaging the Assembly Process of the Organic-Mediated Synthesis of a Zeolite," *Chem. Eur. J.*, 5(7):2083-2088 (1999).

Degnan, T.F. et al., "History of ZSM-5 Fluid Catalytic Cracking Additive Development at Mobile," *Microporous Mesoporous Mater.*, 35-36:245-252 (2000).

de A.A. Soler-Illia, Galo, J. et al., "Chemical Strategies to Design Textured Materials from Microporous and Mesoporous Oxides to Nanonetworks and Hierarchical Structures," *Chem. Rev.*, 102:4093-4138 (2002).

Geidel, E. et al., "Characterization of Mesoporous Materials by Vibrational Spectroscopic Techniques," *Microporous and Mesoporous Mater.*, 65:31-42 (2003).

Harding, R.H. et al., "New Developments in FCC Catalyst Technology," *Appl. Catal. A:Gen.*, 221:389-396 (2001).

Huang, L. et al., "Investigation of Synthesizing MCM-41/ZSM Composites," *J. Phys. Chem. B*. 104:2817-2823 (2000).

(56) References Cited

OTHER PUBLICATIONS

Karlsson, A. et al., "Composites of Micro- and Mesoporous Materials: Simultaneous Syntheses of MFI/MCM-41 Like Phases by a Mixed Template Approach," *Miscroporous and Mesoporous Mater.*, 27:181-192 (1999).

Kloestra, K.R. et al., "Mesoporous Material Containing Framework Tectosilicate by Pore-Wall Recrystallization," *Chem. Commun.*, 23:2281-2282 (1997).

Lee, H. et al., "Materials Science: On the Synthesis of Zeolites,"*ScienceWeek*, downloaded from http://www.scienceweek.com/2003/sa031031-1.htm on Apr. 23, 2005, 5 pgs.

Linssen, T. et al., "Mesoporous Templated Silicates: An Overview of Their Synthesis, Catalytic Activation and Evaluation of the Stability," *Advances in Colloid and Interface Science*, 103:121-147 (2003).

Liu, Y. et al., "Steam-Stable MSU-S Aluminosilicate Mesostructures Assembled from Zeolite ZSM-5 and Zeolite Beta Seeds," *Angew. Chem. Int. Ed.*, 7:1255-1258 (2001).

Liu, Y. et al., "Aluminosilicate Mesostructures with Improved Acidity and Hydrothermal Stability," *J. Mater. Chem.*, 12:3179-3190 (2002).

On, D.T. et al., "Large-Pore Mesoporous Materials with Semi-Crystalline Zeolitic Frameworks," *Angew. Chem. Int. Ed.*, 17:3248-3251 (2001).

Park, D.W. et al., "Catalytic Degradation of Polyethylene Over Solid Acid Catalysts," *Polym. Degrad. Stabil.*, 65:193-198 (1999).

Storck, S. et al., "Characterization of Micro- and Mesoporous Solids by Physisorption Methods and Pore-Size Analysis," *Applied Catalysts A: Gen.* 17:137-146 (1998).

Yang, P. et al., "Generalized Syntheses of Large-Pore Mesoporous Metal Oxides with Semicrystalline Frameworks," *Nature*, 396:152-155 (1998).

Ying, J.Y. et al., "Synthesis and Applications of Supramolecular-Templated Mesoporous Materials," *Angew. Chem. Int. Ed.*, 38:56-77 (1999).

Goto, Y., "Mesoporous Material from Zeolite," *Journal of Porous Materials* 9, 2002, pp. 43-48.

Ogura, M., et al., "Formation of Uniform Mesopores in ZSM-5 Zeolite through Treatment in Alkaline Solution," Chemistry Letters 2000, pp. 882-883.

Bridgwater, A.V., "Castalysis in Thermal Biomass Conversion", Sep. 1993, 43 pages.

Inagaki, et al., "An Ordered Mesoporous Organosilica Hybrid Material with a Crystal-like Wall Structure", Nature, vol. 416, Mar. 2002, pp. 304-307.

Jacobsen et al., "Mesoporous Zeolite Single Crystals", J. Am. Chem. Soc., 2000, 122, 7116-7117.

Lima et al., "Diesel-like Fuel Obtained by Pyrolysis of Vegetable Oils", Science Direct, Journal of Analytical and Applied Pyrolysis, Dec. 2003, pp. 987-996.

Parasad et al., "Catalytic Conversion of Canola Oil to fuels and Chemical Feedstocks Part I. Effect of Process Conditions on the Performance of HZSM-5 Catalyst" University of Saskatchewan, The Canadian Journal of chemical Engineering, vol. 64, Apr. 1986, pp. 278-284.

Weisz P.B. et al., "Catalytic Production of High-Grade Fuel (Gasoline) from Biomass Compounds by Shape-Selective Catalysis" AAAS, vol. 206, Oct. 1979, pp. 57-58.

Poladi, et al., "Syhnthesis, Charaterization and Catalytic Properies of a Microporous/Mesoporous Material, MMM-1", Journal of Solid State Chemistry vol. 167, 2002, pp. 363-369.

Xia, et al., "On the Synthesis and Characterization of ZSM-5/MCM-48 Aluminosilicate Composite Materials" The Royal Society of Chemistry, School of Chemistry, University of Nottingham, Feb. 2004, 8 pages.

Guo et al. "Characterization of Beta/MCM-41 Composite Molecular Sieve Compared with the Mechanical Mixture" Microporous and Mesoporous materials vols. 44-45; 2001; pp. 427-434.

Tao et al. "ZSM-5 Monolith of Uniform Mesoporous Channels" Material Sciences, Chiba University, J. Am. Chem. Soc., Japan, 2003, pp. 6044-6045.

Groen, J.C., "On the introduction of intracrystalline mesoporosity in zeolites upon desilication in alkaline medium," Elsevier, Microporous and Mesoporous Materials 69 (2004) pp. 29-34.

\* cited by examiner (a) (b)

1,3,5 TRIISOPB    1,3 DIISOPB    Cumene    Benzene

↑
Diffusion Limited

COKE ⇐

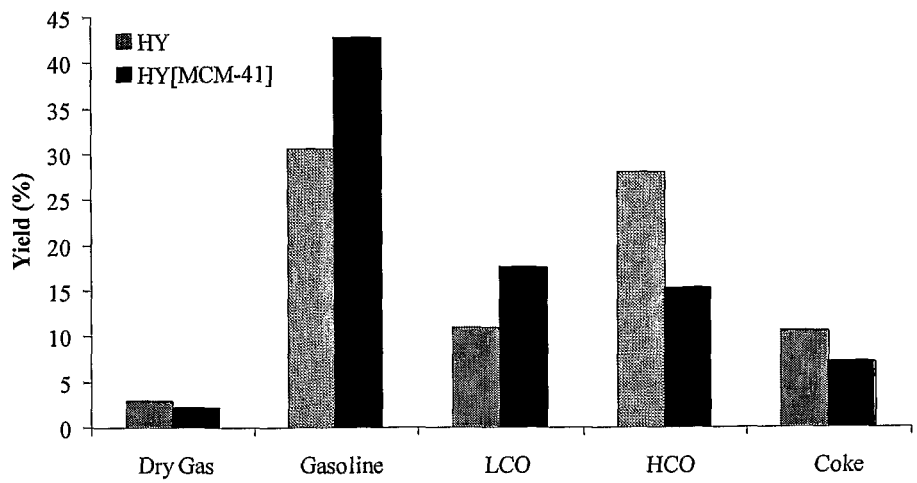

Figure 20B: depicts microactivity test (MAT) results of a conventional fully crystalline zeolite H-Y (Si/Al=15) and its fully crystalline mesostructured version H-Y[MCM-41].

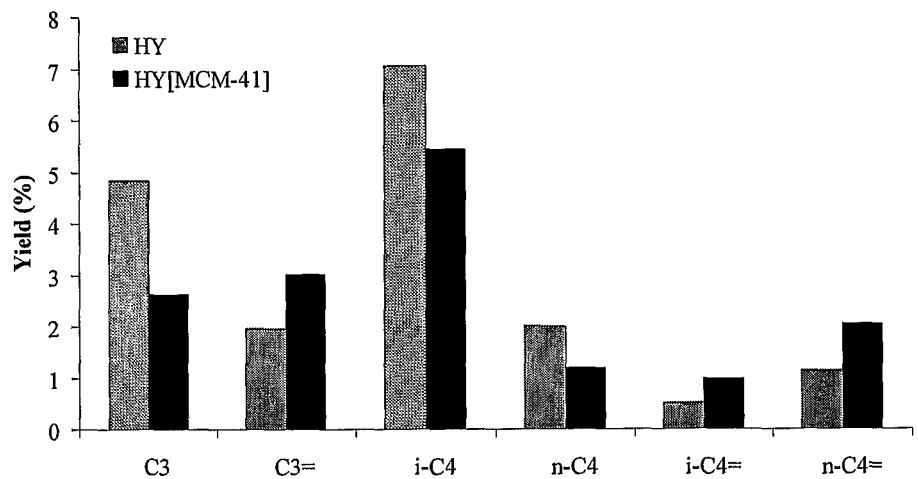

Figure 20C: depicts the composition of the LPG fraction obtained by Microactivity test (MAT) of a conventional fully crystalline zeolite H-Y (Si/Al=15) and its fully crystalline mesostructured version H-Y[MCM-41].

MESOSTRUCTURED ZEOLITIC MATERIALS AND METHODS OF MAKING AND USING THE SAME

RELATED APPLICATIONS

This application is a national stage application of International Application No. PCT/US2005/014129 filed Apr. 22, 2005, which claims the benefit of and priority to U.S. patent application Ser. No. 10/830,714, filed on Apr. 23, 2004, and entitled "Mesostructured Zeolitic Materials, and Methods of Making and Using the Same, the contents of which are incorporated herein by reference in their entirety.

GOVERNMENT FUNDING

This invention was made with support under Grant Number DAAD19-02-D0002, awarded by the Army Research Office; the government, therefore, has certain rights in the invention.

BACKGROUND OF THE INVENTION

Zeolites and related crystalline molecular sieves are widely used due to their regular microporous structure, strong acidity, and ion-exchange capability. van Bekkum, H., Flanigen, E. M., Jacobs, P. A., Jansen, J. C. (editors), Introduction to Zeolite Science and Practice, 2nd edition. Studies in Surface Science and Catalysis, Vol. 137 (2001); Corma, A., *Chem. Rev.*, 1997, 97, 2373-2419; Davis, M. E., *Nature*, 2002, 417, 813-821. However, their applications are limited by their small pore openings, which are typically narrower than 1 nm. The discovery of MCM-41, with tunable mesopores of 2-10 nm, overcomes some of the limitations associated with zeolites. Corma, A., *Chem. Rev.*, 1997, 97, 2373-2419; Kresge, C. T., et al., *Nature*, 1992, 259, 710-712; Kosslick, H., et al., *Appl. Catal. A: Gen.*, 1999, 184, 49-60; Linssen, T., Cassiers, K., Cool, P., Vansant, E. F., Adv. Coll. Interf. Sci., 2003, 103, 121-147. However, unlike zeolites, MCM-41-type materials are not crystalline, and do not possess strong acidity, high hydrothermal stability and high ion-exchange capability, which are important for certain catalytic applications. Corma, A., *Chem. Rev.*, 1997, 97, 2373-2419.

Over the past 10 years, a great deal of effort has been devoted to understanding and improving the structural characteristics of MCM-41. It was found that the properties of Al-MCM-41 could be improved through (i) surface silylation, (ii) Al grafting on the pore walls to increase acidity, (iii) salt addition during synthesis to facilitate the condensation of aluminosilicate groups, (iv) use of organics typically employed in zeolite synthesis to transform partially the MCM-41 wall to zeolite-like structures, (v) preparation of zeolite/MCM-41 composites, (vi) substitution of cationic surfactants by tri-block copolymers and Gemini amine surfactants to thicken the walls, and (vii) assembly of zeolite nanocrystals into an ordered mesoporous structure. Liu, Y., Pinnavaia, T. J., *J. Mater. Chem.*, 2002, 12, 3179-3190. In the latter approach, Liu et al. were able to prepare the first steam-stable hexagonal aluminosilicate (named MSU-S) using zeolite Y nanoclusters as building blocks. Pentasil zeolite nanoclusters were also used to produce MSU-S$_{(MFI)}$ and MSU-S$_{(BEA)}$.

U.S. Pat. No. 5,849,258 to Lujano et al. aggregates the nuclei of crystalline microporous molecular sieve material (e.g., the nuclei of zeolites) to provide a narrowed size distribution of mesopore-sized pore volumes, forming a polycrystalline material. FIG. 1A is a schematic illustration of a prior art amorphous mesoporous material 100, which is described by, for example, Lujano and Pinnavaia. U.S. Pat. No. 5,849, 258 to Lujano et al. and Liu, Y., Pinnavaia, T. J., *J. Mater. Chem.*, 2002, 12, 3179-3190. As shown in FIG. 1A, zeolite nucleii 105a, 105b, 105c were aggregated around surfactant micelles under controlled conditions to form a solid. Thereafter, the aggregated nuclei 105a, 105b, 105c are washed in water and dried and the surfactant is extracted to provide a desired mesopore-sized pore volume 110, forming amorphous mesoporous zeolite nuclei material 100. Each of the zeolite nuclei, for example, 105a, 105b, 105c, is a nanosized crystal. When they are aggregated the material 100 is polycrystalline because the nuclei material is lacking the long-range regular lattice structure of the crystalline state (i.e., the aggregated nuclei are not fully crystalline or truly crystalline).

Some strategies have managed to improve appreciably the acidic properties of Al-MCM-41 materials. Liu, Y., Pinnavaia, T. J., *J. Mater. Chem.*, 2002, 12, 3179-3190; van Donk, S., et al., *Catal. Rev.*, 2003, 45, 297-319; Kloetstra, K. R., et al., *Chem. Commun.*, 1997, 23, 2281-2282; Corma, A., *Nature*, 1998, 396, 353-356; Karlsson, A., et al., *Microporous Mesoporous Mater.*, 1999, 27, 181-192; Jacobsen, C. J. H., et al., *J. Am. Chem. Soc.*, 2000, 122, 7116-7117; Huang L., et al., *J. Phys. Chem. B.*, 2000, 104, 2817-2823; On, D. T., et al., *Angew. Chem. Int. Ed.*, 2001, 17, 3248-3251; Liu, Y., et al., *Angew. Chem. Int. Ed.*, 2001, 7, 1255-1258. However, due to the lack of long-range crystallinity in these materials, their acidity was not as strong as those exhibited by zeolites. Corma, A., Chem. Rev., 1997, 97, 2373-2419. For example, semicrystalline mesoporous materials, such as nanocrystalline aluminosilicate PNAs and Al-MSU-S$_{(MFI)}$, even being more active than conventional Al-MCM-41, showed significantly lower activity than H-ZSM-5 for cumene cracking; the catalyst activity for this reaction has usually been correlated to the Bronsted acid strength of the catalyst. Corma, A., *Chem. Rev.*, 1997, 97, 2373-2419; Liu, Y., Pinnavaia, T. J., *J. Mater. Chem.*, 2002, 12, 3179-3190; Kloetstra, K. R., et al., *Chem. Commun.*, 1997, 23, 2281-2282; Jacobsen, C. J. H., et al., *J. Am. Chem. Soc.*, 2000, 122, 7116-7117.

Previous attempts to prepare mesostructured zeolitic materials have been ineffective, resulting in separate zeolitic and amorphous mesoporous phases. Karlsson, A., et al., *Microporous Mesoporous Mater.*, 1999, 27, 181-192; Huang L., et al., *J. Phys. Chem. B.*, 2000, 104, 2817-2823.

Moreover, some authors pointed out the difficulty of synthesizing thin-walled mesoporous materials, such as MCM-41, with zeolitic structure, due to the surface tension associated with the high curvature of the mesostructure. Liu, Y., Pinnavaia, T. J., *J. Mater. Chem.*, 2002, 12, 3179-3190. Thus, the need exists for zeolite single crystals with ordered mesoporosity, and methods of making and using them.

SUMMARY OF THE INVENTION

In one aspect, the present invention relates to a crystalline inorganic material organized in a mesostructure. In a further embodiment, the inorganic material is a metal oxide. In a further embodiment, the inorganic material is a zeolite. In a further embodiment, the inorganic material is a zeotype. In a further embodiment, the inorganic material has a faujasite, mordenite, or ZSM-5 (MFI) structure. In a further embodiment, the mesostructure has the hexagonal pore arrangement of MCM-41. In a further embodiment, the mesostructure has the cubic pore arrangement of MCM-48. In a further embodiment, the mesostructure has the lamellar pore arrangement of MCM-50. In a further embodiment, the mesostructure has pores organized in a foam arrangement. In a further embodiment, the mesostructure has randomly placed pores.

In a further embodiment, the mesostructure is a one dimensional nanostructure. In a further embodiment, the nanostructure is a nanotube, nanorod, or nanowire.

In a further embodiment, the mesostructure is a two dimensional nanostructure. In a further embodiment, the nanostructure is a nanoslab, nanolayer, or nanodisc.

In a further embodiment, the crystalline inorganic material is Y[MCM-41], MOR[MCM-41], or ZSM-5-[MCM-41].

In a further embodiment, the mean pore diameter within the mesostructure is about 2 to about 5 nm. In a further embodiment, the mean pore diameter within the mesostructure is about 2 to about 3 nm. In a further embodiment, the wall thickness within the mesostructure is about 1 to about 5 nm. In a further embodiment, the wall thickness within the mesostructure is about 1 to about 3 nm.

In another aspect, the present invention relates to a method of preparing a mesostructured zeolite comprising: a) adding a zeolite to a medium comprising an acid or base, and optionally a surfactant; b) adding a surfactant to the medium from step a) if it is not there already; c) optionally adding a swelling agent to the medium from step b); d) optionally hydrothermally treating the medium from step b) or c); and e) washing and drying the resulting material.

In a further embodiment, the resulting material is further calcined at elevated temperatures. In a further embodiment, the calcination step is performed in air or oxygen. In a further embodiment, the calcination step is performed in an inert gas. In a further embodiment, the inert gas is $N_2$. In a further embodiment, the maximum elevated temperatures are at about 500 to 600° C. In a further embodiment, the maximum elevated temperatures are at about 550° C.

In a further embodiment, the zeolite is selected from the group consisting of faujasite (FAU), mordenite (MOR), and ZSM-5 (MWI). In a further embodiment, the medium in step a) comprises a base. In a further embodiment, the base is an alkali hydroxide, alkaline earth hydroxide, $NH_4OH$ or a tetralkylammonium hydroxide. In a further embodiment, the base is NaOH, $NH_4OH$, or tetramethylammonium hydroxide. In a further embodiment, the medium in step a) comprises an acid. In a further embodiment, the acid is HF. In a further embodiment, the surfactant is an alkylammonium halide. In a further embodiment, the surfactant is a cetyltrimethylammonium bromide (CTAB) surfactant. In a further embodiment, hydrothermally treating the medium from step b) or c) occurs at about 100 to about 200° C. In a further embodiment, hydrothermally treating the medium from step b) or c) occurs at about 120 to about 180° C. In a further embodiment, hydrothermally treating the medium from step b) or c) occurs at about 140 to about 160° C. In a further embodiment, hydrothermally treating the medium from step b) or c) occurs at about 150° C. In a further embodiment, hydrothermally treating the medium from step b) or c) takes place overnight. In a further embodiment, hydrothermally treating the medium from step b) or c) takes place over about 20 hours.

In another aspect, the present invention relates to a mesostructured zeolite prepared by any of the aforementioned methods.

In another aspect, the present invention relates to a method of preparing a mesostructured zeolite comprising: a) adding a zeolite in its acidic form to a medium comprising a base, and optionally a surfactant, in which the zeolite is partially dissolved to produce a suspension; b) adding a surfactant to the medium from step a) if it is not there already; c) optionally adding a swelling agent to the medium from step b); d) optionally hydrothermally treating the medium from step b) or c); e) washing and drying the resulting material; and f) removing the surfactant from the resulting material either by calcining at elevated temperatures, or by solvent extraction.

In another aspect, the present invention relates to a mesostructured zeolite prepared by the above method, wherein the mesostructured zeolite is in the form of a nanotube, nanorod, or nanowire.

In another aspect, the present invention relates to a mesostructured zeolite prepared by the above method, wherein the mesostructured zeolite is in the form of a nanoslab, nanolayer, or nanodisc.

In another aspect, the present invention relates to a method of anchoring a positively charged chemical species to a mesostructured zeolite comprising contacting the mesostructured zeolite and the positively charged species in a medium. In a further embodiment, the positively charged species is selected from the group consisting of cations of an element, quaternary amines, ammonium ions, pyridinium ions, phosphonium ions, and mixtures thereof.

In another aspect, the present invention relates to a method of anchoring a chemical species to a mesostructured zeolite comprising: contacting the mesostructured zeolite in its acidic form and a basic chemical species in a medium. In a further embodiment, the basic chemical species is an inorganic base or an organic base. In a further embodiment, the basic chemical species is selected from the group consisting of hydroxide, amine, pyridine, phosphine, and mixtures thereof.

In another aspect, the present invention relates to a method of anchoring a homogeneous catalyst on a mesostructured zeolite comprising: contacting a mesostructured zeolite comprising a chemical species anchored on it, and a homogeneous catalyst in a medium, wherein the anchored chemical species is capable of acting as a ligand to the homogeneous catalyst.

In another aspect, the present invention relates to a method of supporting a heterogeneous catalyst on a mesostructured zeolite comprising contacting the mesostructured zeolite and the heterogeneous catalyst by a method selected from the group consisting of physical mixture, dry impregnation, wet impregnation, incipient wet impregnation, ion-exchange, and vaporization. In a further embodiment, the heterogeneous catalyst comprises a metal or a mixture thereof. In a further embodiment, the heterogeneous catalyst comprises a metal oxide or a mixture thereof. In a further embodiment, the heterogenous catalyst comprises a nanoparticle, cluster, or colloid.

In another aspect, the present invention relates to a method of catalytically cracking an organic compound comprising contacting the organic compound with a mesostructured zeolite. In a further embodiment, the organic compound is a hydrocarbon. In a further embodiment, the organic compound is an unsaturated hydrocarbon. In a further embodiment, the organic compound is an aromatic hydrocarbon. In a further embodiment, the organic compound is an alkylated benzene. In a further embodiment, the organic compound is 1,3,5-triisopropyl benzene. In a further embodiment, the organic compound is crude oil. In a further embodiment, the organic compound is gas-oil. In a further embodiment, the organic compound is vacuum gas oil. In a further embodiment, the mesostructured zeolite has the zeolitic structure of a faujasite (FAU), mordenite (MOR), or ZSM-5 (MFI). In a further embodiment, the mesostructured zeolite has the hexagonal pore arrangement of MCM-41. In a further embodiment, the mesostructured zeolite is Y[MCM-41], MOR [MCM-41], or ZSM-5-[MCM-41].

In another aspect, the present invention relates to a method of refining crude oil comprising contacting the crude oil with a mesostructured zeolite. In a further embodiment, the contacting of the oil with the mesostructured zeolite takes place within a Fluid Catalytic Cracking Unit. In a further embodiment, production of gasoline is increased relative to the amount of gasoline produced in the absence of the mesostructured zeolite. In a further embodiment, production of light olefins is increased relative to the amount of light olefins produced in the absence of the mesostructured zeolite.

In another aspect, the present invention relates to a method of catalytically degrading a polymer comprising contacting the polymer with a mesostructured zeolite. In a further embodiment, the polymer is a hydrocarbon polymer. In a further embodiment, the polymer is a poly(alkylene), poly(alkynyl) or poly(styrene). In a further embodiment, the polymer is polyethylene (PE). In a further embodiment, the mesostructured zeolite has the zeolitic structure of a faujasite (FAU), mordenite (MOR), or ZSM-5 (MFI). In a further embodiment, the mesostructured zeolite has the hexagonal pore arrangement of MCM-41. In a further embodiment, the mesopostructured zeolite is Y[MCM-41], MOR[MCM-41], or ZSM-5-[MCM-41].

In another aspect, the invention relates to an inorganic material having a fully crystalline mesostructure. The fully crystalline mesostructure includes mesopore surfaces defining a plurality of mesopores. A cross-sectional area of each of the plurality of mesopores is substantially the same. In one embodiment, the material has a pore volume. For example, the plurality of mesopores have a pore volume of the material and the pore volume of the plurality of mesopores is controlled. The pore volume can be from about 0.05 cc/g to about 2 cc/g, in another embodiment, the pore volume is from about 0.5 cc/g to about 1 cc/g. The fully crystalline inorganic material can be, for example, mono crystalline, multi crystalline, or single crystalline.

An area of each of the plurality of mesopores has a controlled cross sectional area range. The controlled cross sectional area has, for example, a controlled distribution range. Optionally, the controlled cross sectional area has a diameter and the diameter ranges from about 2 nm to about 60 nm. In one embodiment, each mesopore diameter has a controlled distribution range, for example, each mesopore diameter falls within a 1 nm distribution range. Alternatively, the controlled cross sectional area has a diameter ranging from about 2 nm to about 5 nm, or from about 2 nm to about 3 nm.

The inorganic material can have, for example, a 1D pore structure, a 2D pore structure, or a 3D pore structure prior to defining the plurality of mesopores. The material can be a metal oxide, a zeolite, a zeotype, aluminophosphate, gallophosphate, zincophosphate, titanophosphate, faujasite (FAU), mordenite (MOR), ZSM-5 (MFI), or CHA, or any combination thereof.

The fully crystalline mesostructure can have a controlled pore arrangement. The niesostructure pore arrangement can be: an organized pore arrangement, the hexagonal pore arrangement of MCM-41, the cubic pore arrangement of MCM-48, the lamellar pore arrangement of MCM-50, the hexagonal pore arrangement of SBA-15, or a foam-like arrangement. Alternatively, the mesostructure can have randomly placed pores. The fully crystalline mesostructure can be, for example, Y[MCM-41], MOR[MCM-41], ZSM-5-[MCM-41], Y[MCM-48], MOR[MCM-48], ZSM-5-[MCM-48], Y[MCM-50], MOR[MCM-50], or ZSM-5-[MCM-50]. A wall thickness between adjacent mesopores can measure about 1 nm to about 5 nm, or about 1 nm to about 3 nm.

A charged chemical species, for example a positively charged chemical species, can be anchored to the fully crystalline mesostructure. The charged chemical species can be cations of an element, quaternary amines, ammonium ions, pyridinium ions, or phosphonium ions, or any combination thereof. Alternatively, a chemical species can be anchored and/or covalently bonded to the fully crystalline mesostructure. The chemical species can be a basic chemical species, an inorganic base, an organic base, hydroxide, amine, pyridine, or phosphine, or any combination thereof. In another embodiment, a homogeneous catalyst adheres to the inorganic material and a chemical species binds to the homogeneous catalyst A heterogeneous catalyst can be supported by the fully crystalline mesostructure. The heterogeneous catalyst can be a metal, a metal oxide, a nanoparticle, a cluster, or a colloid, or any combination thereof.

In another aspect, the invention relates to an inorganic material that has an external surface contour substantially the same as the external surface contour of the material prior to defining the plurality of mesopores. In another aspect, the invention relates to a material that has a chemical composition framework substantially the same as the chemical composition framework of the material prior to defining the plurality of mesopores. For example, the framework has unchanged stoichiometry after the mesopores are defined.

In another aspect, the invention relates to a material that has a connectivity substantially the same as the connectivity of the material prior to defining the plurality of mesopores. In another aspect, the invention relates to a material that has an improved intracrystalline diffusion compared to the intracrystalline diffusion of the material prior to defining the plurality of mesopores.

In another aspect, the invention relates to a method of making an inorganic material that includes the steps of (a) providing a fully crystalline inorganic material, (b) exposing the fully crystalline inorganic material to a pH controlled medium under a first set of time and temperature conditions, (c) exposing the fully crystalline inorganic material to a surfactant under a second set of time and temperature conditions, and (d) treating the inorganic material by controlling the first and second set of time and temperature conditions to form a plurality of mesopores having a controlled cross sectional area within the fully crystalline inorganic material. Optionally, the method includes the step (e) adjusting the first and second set of time and temperature conditions such that the plurality of mesopores is arranged in a hexagonal [MCM-41] pore arrangement, in a cubic [MCM-48] pore arrangement, in a lamellar [MCM-50] pore arrangement, in a hexagonal [SBA-15] pore arrangement, in a foam-like pore arrangement, in a random pore arrangement, in an organized pore arrangement, or in a controlled pore arrangement in the fully crystalline inorganic material.

In one embodiment, the step (b) includes selecting the pH controlled medium to control a pore volume of the fully crystalline inorganic material, to control a diameter of each of the plurality of mesopores, or to control a cross sectional area of each of a plurality of mesopores in the fully crystalline inorganic material. In another embodiment, the step (c) includes selecting a quantity of the surfactant to control a pore volume of the fully crystalline inorganic material, to control a diameter of each of the plurality of mesopores, or to control a cross sectional area of each of a plurality of mesopores in the fully crystalline inorganic material. In another embodiment, the method further includes the step of adding a swelling agent and/or a triblock copolymer to the pH controlled medium.

In another embodiment, the material produced in step (d) is washed and dried. Alternatively, or in addition, surfactant is removed from material produced in step (d) by, for example, extracting the surfactant and/or calcining the surfactant after performing steps (a) through (d).

In another embodiment, the first or second temperature conditions can include hydrothermal conditions. The first or second temperature conditions can include room temperature conditions and/or can range from about 100 to about 200° C. The first or second time conditions can range from about 1 hour to about 2 weeks.

The fully crystalline inorganic material can be a metal oxide, a zeolite, a zeotype, aluminophosphate, gallophosphate, zincophosphate, titanophosphate, faujasite (FAU), mordenite (MOR), ZSM-5 (MFI), or CHA, or any combination thereof. The pH controlled medium can include a pH control setpoint that is at least about 8 to not more than about 12, at least about 10 to not more than about 14, at least about 2 to not more than about 6, or at least about −2 to not more than about 2.

The surfactant can be cationic, ionic, or neutral surfactants, or any combination thereof. For example, the surfactant can be cetyltrimethylammonium bromide (CTAB).

The method of making the inorganic material can also include introducing a charged chemical species to the fully crystalline inorganic material produced in step (d). The charged chemical species can: positively charged. In addition, the charged chemical species can be cations of an element, quaternary amines, ammonium ions, pyridinium ions, or phosphonium ions, or any combinations thereof.

The method of making the inorganic material can also include introducing a chemical species to the fully crystalline inorganic material produced in step (d). The chemical species can be a basic chemical species, an inorganic base, an organic base, hydroxide, amine, pyridine, or phosphine, or any combination thereof. A homogeneous catalyst can be added such that the chemical species binds to the homogeneous catalyst. A heterogeneous catalyst can be contacted with the fully crystalline inorganic material produced in step (d). The heterogeneous catalyst can be a metal, a metal oxide, a nanoparticle, a cluster, or a colloid, or any combination thereof.

In another aspect, the invention relates to an inorganic material made by the process of (a) providing a fully crystalline inorganic material, (b) exposing the fully crystalline inorganic material to a pH controlled medium under a first set of time and temperature conditions, (c) exposing the fully crystalline inorganic material to a surfactant under a second set of time and temperature conditions; and (d) treating the inorganic material by controlling the first and second set of time and temperature conditions to form a plurality of mesopores having a controlled cross sectional area within the fully crystalline inorganic material.

In another aspect, the invention relates to a hydrocarbon material produced by the process of reacting a larger hydrocarbon material in the presence of a catalyst including inorganic material having a fully crystalline mesostructure. The fully crystalline mesostructure includes mesopore surfaces defining a plurality of mesopores. A cross-sectional area of each of the plurality of mesopores is substantially the same. The hydrocarbon material produced by this process can be 1,3-diisopropyl benzene, gasoline, propylene, butene, coke, total dry gas, or liquefied petroleum gases, or combinations thereof.

In another aspect, the invention relates to a method of catalytically cracking an organic compound. The method includes the step of contacting the organic compound with an inorganic material having a fully crystalline mesostructure. The fully crystalline mesostructure includes mesopore surfaces defining a plurality of mesopores. A cross-sectional area of each of the plurality of mesopores is substantially the same.

The organic compound can be at least one of a hydrocarbon, unsaturated hydrocarbon, an aromatic hydrocarbon, an alkylated benzene, 1,3,5-triisopropyl benzene, crude oil, gas-oil, or vacuum gas oil. Optionally, the cross sectional area has a diameter greater than a diameter of the organic compound being cracked.

In another aspect, the invention relates to a method of processing crude oil. The method includes contacting crude oil with an inorganic material having a fully crystalline mesostructure. The fully crystalline mesostructure includes mesopore surfaces defining a plurality of mesopores. A cross-sectional area of each of the plurality of mesopores is substantially the same. The crude oil is reacted in the presence of the inorganic material under conditions of controlled temperature and pressure. The crude oil can be reacted in the presence of the inorganic material within a Fluid Catalytic Cracking unit. In one embodiment, the fraction of gasoline produced is increased relative to the amount of gasoline produced using a fully crystalline inorganic material. In another embodiment, light olefin production is increased relative to the amount of light olefins produced using a fully crystalline inorganic material.

In another aspect, the invention relates to a method of processing a polymer. The method includes contacting a polymer with an inorganic material having a fully crystalline mesostructure. The fully crystalline mesostructure includes mesopore surfaces defining a plurality of mesopores. A cross-sectional area of each of the plurality of mesopores is substantially the same. The polymer can be thermally treated in the presence of the inorganic material. The polymer can be a hydrocarbon polymer, poly(alkylene), poly(alkynyl), poly(styrene), or polyethylene (PE), or any combination thereof.

In another aspect, the invention relates to a benzene compound made by the process of contacting a crude oil with an inorganic material having a fully crystalline mesostructure. The fully crystalline mesostructure includes mesopore surfaces defining a plurality of mesopores. A cross-sectional area of each of the plurality of mesopores is substantially the same. The crude oil is reacted in the presence of the inorganic material under conditions of controlled temperature and pressure. The benzene compound can include benzene derivatives such as, for example, toluene and xylene. In one embodiment the quantity of benzene compound produced with the inorganic material having a fully crystalline mesostructure is a lesser quantity than is produced with a conventional unmodified fully crystalline zeolite.

In another aspect, the invention relates to a gasoline compound made by the process of contacting a crude oil with an inorganic material having a fully crystalline mesostructure. The fully crystalline mesostructure includes mesopore surfaces defining a plurality of mesopores. A cross-sectional area of each of the plurality of mesopores is substantially the same. The crude oil is reacted in the presence of the inorganic material under conditions of controlled temperature and pressure. In one embodiment the quantity of gasoline produced with the inorganic material having a fully crystalline mesostructure is a greater quantity than is produced with a conventional unmodified fully crystalline zeolite.

In another aspect, the invention relates to a method of water treatment that includes contacting contaminated water with an inorganic material having a fully crystalline mesostructure. The fully crystalline mesostructure includes mesopore surfaces defining a plurality of mesopores. A cross-sectional area of each of the plurality of mesopores is substantially the same. Contaminants from the water are removed with the inorganic material. In one embodiment, the removed contaminant is a dye.

In another aspect, the invention relates to an inorganic material that includes a crystalline nanostructure having a plurality of members. Each member defines a plurality of pores and adjacent members define voids therebetween. At least one dimension of each of the plurality of members is less than 100 nm. In one embodiment, at least one dimension of each of the plurality of member measures between about 3 nm and about 20 nm. In one embedment, the inorganic material is semi crystalline or poly crystalline. The nanostructure can be one dimensional, two dimensional, or three dimensional. The nanostructure can be a nanotube, nanoring, nanorod, nanowire, nanoslab, nanolayer, or nanodisc. In one embodiment, one member has one nanostructure and another member has another nanostructure, for example, a nanorod is adjacent a nanotube. The inorganic material can include a metal oxide, a zeolite, a zeotype, aluminophosphate, gallophosphate, zincophosphate, titanophosphate, faujasite (FAU), mordenite (MOR), and ZSM-5 (MFI), or CHA, or any combination thereof. The nanostructure can be, for example, nanostructure is Y[ZNR], MOR[ZNR], or ZSM-5-[ZNR].

In another aspect, the invention relates to a method of making an inorganic material that includes the steps of (a) providing a crystalline inorganic material, (b) exposing the crystalline inorganic material to a pH controlled medium to partially dissolve the crystalline inorganic material producing an amorphous inorganic material, (c) adjusting the pH of the amorphous inorganic material, (d) exposing the amorphous inorganic material to a surfactant, and (e) treating the inorganic material by controlling time and temperature conditions of steps (b) through (d) to form nanostructures. Optionally, the method further includes treating the inorganic material by controlling the time and temperature conditions to first form a [MCM-50] mesostructure and then to form nanostructures.

In one embodiment of the method, the pH controlled medium has a pH control setpoint that is at least about 10 to not more than about 14, that is at least about 2 to not more than about 6, or that is at least about −2 to not more than about 2. In another embodiment, the amorphous inorganic material has a pH ranging from about 8 to about 12. The temperature conditions can range from about 100 to about 200° C. The time can range from about 12 hours to about 2 weeks. The temperature conditions can be hydrothermal temperature conditions.

In one embodiment, the surfactant employed in accordance with the method is a cationic surfactant, an ionic surfactant, or a neutral surfactants, or any combination thereof. For example, cetyltrimethylammonium bromide (CTAB) can be employed as a surfactant. The fully crystalline inorganic material can be a metal oxide, a zeolite, a zeotype, aluminophosphate, gallophosphate, zincophosphate, titanophosphate, faujasite (FAU), mordenite (MOR), and ZSM-5 (MFI), or CHA, or any combination thereof.

In another aspect, the invention relates to an inorganic material made by the process of (a) providing a crystalline inorganic material, (b) exposing the crystalline inorganic material to a pH controlled medium to partially dissolve the crystalline inorganic material producing an amorphous inorganic material, (c) adjusting the pH of the amorphous inorganic material, (d) exposing the amorphous inorganic material to a surfactant, and (e) treating the inorganic material by controlling time and temperature conditions of steps (b) through (d) to form nanostructures.

In another aspect, the invention relates to a cracked organic compound made by the process of contacting an organic compound with an inorganic material that includes a crystalline nanostructure having a plurality of members. Each member defines a plurality of pores and adjacent members define voids therebetween. At least one dimension of each of the plurality of members is less than 100 nm. In one embodiment, the hydrocarbon material is 1,3-diisopropyl benzene, gasoline, propylene, butene, coke, total dry gas, or liquefied petroleum gases, or combinations thereof.

In another aspect, the invention relates to a method of catalytically cracking an organic compound. The method includes contacting the organic compound with an inorganic material that includes a crystalline nanostructure having a plurality of members. Each member defines a plurality of pores and adjacent members define voids therebetween. At least one dimension of each of the plurality of members is less than 100 nm. In one embodiment, the organic compound is at least one of a hydrocarbon, unsaturated hydrocarbon, an aromatic hydrocarbon, an alkylated benzene, 1,3,5-triisopropyl benzene, crude oil, gas-oil, or vacuum gas oil.

In another aspect, the invention relates to a method of processing crude oil. The method includes contacting crude oil with an inorganic material that includes a crystalline nanostructure having a plurality of members. Each member defines a plurality of pores and adjacent members define voids therebetween. At least one dimension of each of the plurality of members is less than 100 nm. The crude oil is reacted in the presence of the inorganic material under conditions of controlled temperature and pressure. Optionally, the crude oil is reacted in the presence of the inorganic material within a Fluid Catalytic Cracking unit. In one embodiment, the fraction of gasoline produced is increased relative to the amount of gasoline produced using a fully crystalline inorganic material. In another embodiment, light olefin production is increased relative to the amount of light olefins produced using a fully crystalline inorganic material.

In another aspect, the invention relates to a method of processing a polymer. The method includes contacting a polymer with an inorganic material that includes a crystalline nanostructure having a plurality of members. Each member defines a plurality of pores and adjacent members define voids therebetween. At least one dimension of each of the plurality of members is less than 100 nm. The polymer can be thermally treated in the presence of the inorganic material. The polymer can be a hydrocarbon polymer, poly(alkylene), poly(alkynyl), poly(styrene), or polyethylene (PE), or any combination thereof.

In another aspect, the invention relates to a benzene compound made by the process of contacting a crude oil with an inorganic material that includes a crystalline nanostructure having a plurality of members. Each member defines a plurality of pores and adjacent members define voids therebetween. At least one dimension of each of the plurality of members is less than 100 nm. The crude oil is reacted in the presence of the inorganic material under conditions of controlled temperature and pressure. The benzene compound can include benzene derivatives such as, for example, toluene and xylene. In one embodiment the quantity of benzene compound produced with the crystalline nanostructure material is a lesser quantity than is produced with a conventional unmodified fully crystalline zeolite.

In another aspect, the invention relates to a gasoline compound made by the process of contacting a crude oil with an inorganic material that includes a crystalline nanostructure having a plurality of members. Each member defines a plurality of pores and adjacent members define voids therebetween. At least one dimension of each of the plurality of members is less than 100 nm. The crude oil is reacted in the presence of the inorganic material under conditions of controlled temperature and pressure. In one embodiment the quantity of gasoline produced with the inorganic material having a crystalline nanostructure is a greater quantity than is produced with a conventional unmodified fully crystalline zeolite.

In another aspect, the invention relates to a method of water treatment that includes contacting contaminated water with an inorganic material that includes a crystalline nanostructure having a plurality of members. Each member defines a plurality of pores and adjacent members define voids therebetween. At least one dimension of each of the plurality of members is less than 100 nm. Contaminants from the water are removed with the inorganic material. In one embodiment, the removed contaminant is a dye.

These embodiments of the present invention, other embodiments, and their features and characteristics, will be apparent from the description, drawings and claims that follow.

Figure 20A:
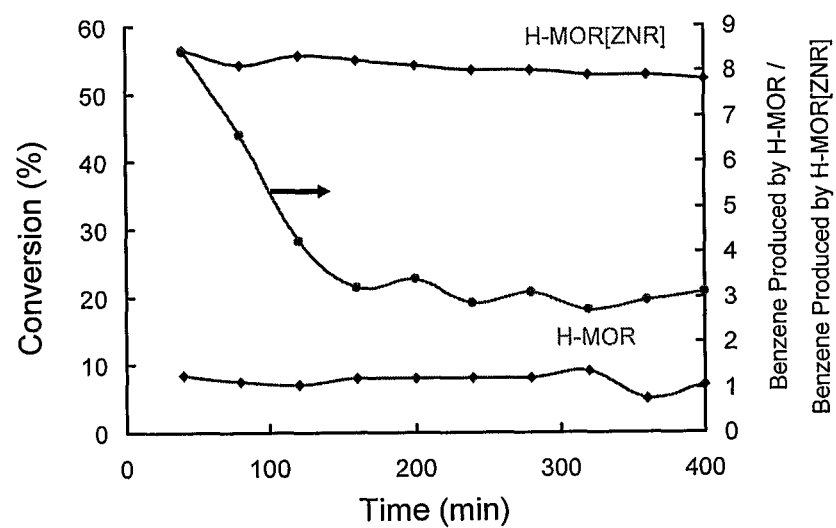

FIG. 20A depicts, on the left hand side Y axis, the conversion of 1,3,5-triisopropylbenzene versus time for the nanostructure H-MOR[ZNR] and the unmodified fully crystalline zeolite H-MOR. The ratio of benzene produced by H-MOR/benzene produced by H-MOR[ZNR] as a function of time is also shown on the right hand side Y axis. A helium flow of 50 mL/min saturated with 1,3,5-triisopropylbenzene at 120° C. was introduced over 50 mg of each catalyst, H-MOR[ZNR] and H-MOR, at 200° C.

FIG. 20B depicts microactivity test (MAT) results of a conventional fully crystalline zeolite H—Y (Si/Al=15) and its fully crystalline mesostructured version H—Y[MCM-41].

FIG. 20C depicts the composition of the LPG fraction obtained by Microactivity test (MAT) of a conventional fully crystalline zeolite H—Y (Si/Al=15) and its fully crystalline mesostructured version H—Y[MCM-41].

Figure 21:
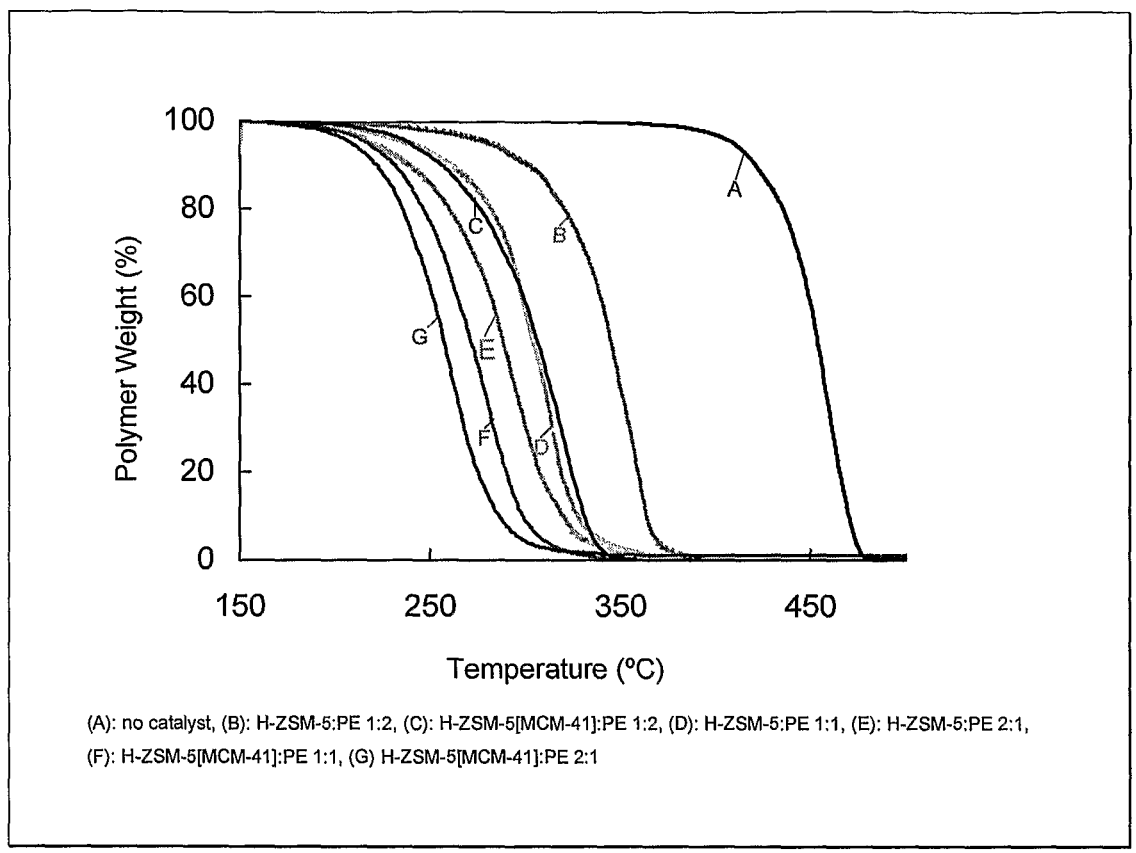

FIG. 21 depicts the percentage of polyethylene (PE) weight lost vs. temperature for the mixtures of catalysts in weight ratio to PE labelled: (A): no catalyst, (B): H-ZSM-5:PE 1:2, (C): H-ZSM-5-[MCM-4]:PE 1:2, (D): H-ZSM-5:PE 1:1, (E) H-ZSM-5:PE 2:1, (F): H-ZSM-5 [MCM-41]:PE 1:1, and (G) H-ZSM-5 [MCM-41]:PE 2:1.

Figure 22:
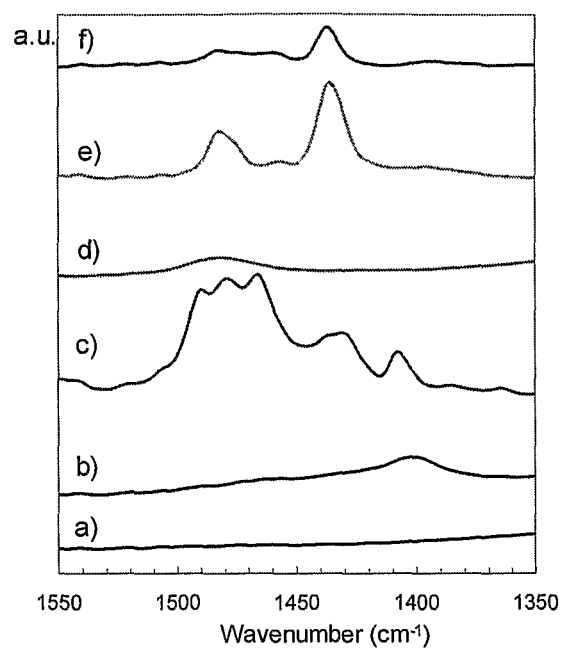

FIG. 22 depicts the FTIR spectra of a) H—Y[MCM-41], b) $NH_4$—Y[MCM-41], c) $NH_2(CH_2)_2NMe_3Cl$, d) $NH_2(CH_2)_2NMe_3$-Y[MCM-41], d) $Rh(PPh_3)_3Cl$, and e) $Rh(PPh_3)_3NH_2(CH_2)_2NMe_3$-Y[MCM-41].

DETAILED DESCRIPTION OF THE INVENTION

Definitions

For convenience, before further description of the present invention, certain terms employed in the specification, examples, and appended claims are collected here. These definitions should be read in light of the remainder of the disclosure and understood as by a person of skill in the art.

The articles "a" and "an" are used herein to refer to one or more than one (i.e., at least one) of the grammatical object of the article. By way of example, "an element" means one element or more than one element.

The term "catalyst" is art-recognized and refers to any substance that notably affects the rate of a chemical reaction without itself being consumed or significantly altered.

The terms "comprise" and "comprising" are used in the inclusive, open sense, meaning that additional elements may be included.

The term "cracking" is art-recognized and refers to any process of breaking up organic compounds into smaller molecules.

The term "including" is used to mean "including but not limited to". "Including" and "including but not limited to" are used interchangeably.

"MCM-41" represents a Mobil composite of matter and refers to an amorphous mesoporous silica with a hexagonal pore arrangement, wherein the mean pore diameter is in the range of about 2-10 nm.

"MCM-48" represents a Mobil composite of matter and refers to an amorphous mesoporous silica with a cubic pore arrangement, wherein the mean pore diameter is in the range of about 2-10 nm.

"MCM-50" represents a Mobil composite of matter and refers to an amorphous mesoporous silica with a lamellar pore arrangement, wherein the mean pore diameter is in the range of about 2-10 nm.

The term "mesoporous" is art-recognized and refers to a porous material comprising pores with an intermediate size, ranging anywhere from about 2 to about 50 nanometers.

The term "mesostructure" is art-recognized and refers to a structure comprising mesopores which control the architecture of the material at the mesoscopic or nanometer scale, including ordered and non-ordered mesostructured materials, as well as nanostructured materials, i.e. materials in which at least one of their dimension is in the nanometer size range, such as nanotubes, nanorings, nanorods, nanowires, nanoslabs, and the like.

The term "mesostructured zeolites" as used herein includes all crystalline mesoporous materials, such as zeolites, aluminophosphates, gallophosphates, zincophosphates, titanophosphates, etc. Its mesostructure maybe in the form of ordered mesporosity (as in, for example MCM-41, MCM-48 or SBA-15), non-ordered mesoporosity (as in mesocellular foams (MCF)), or mesoscale morphology (as in nanorods and nanotubes). The notation zeolite[mesostructure] is used to designate the different types of mesostructured zeolites.

"MOR" represents a mordenite which is a zeolite comprising approximately 2 moles of sodium and potassium and approximately 1 mole of calcium in its orthorhombic crystal structure. This term also includes the acidic form of MOR which may also be represented as "H-MOR."

"MSU-S (MFI)" represents a mesoporous material made with nanosized zeolites with a pore range of about 2-15 nm. The (MFI) refers to its structure.

"MSU-S (BEA)" represents a mesoporous material made with nanosized zeolites with a pore range of about 1-15 nm. The (BEA) refers to its structure.

"PNA" represents a semicrystallized form of MCM-41.

"SBA-15" represents mesoporous (alumino) silicas with pore diameters up to 30 nm arranged in a hexagonal manner and pore walls up to 6 nm thick.

The term "surfactant" is art-recognized and refers to any surface-active agent or substance that modifies the nature of surfaces, often reducing the surface tension of water. Cetyltrimethylammonium bromide is a non-limiting example of a surfactant.

"Y" represents a faujasite which is a zeolite comprising 2 moles of sodium and 1 mole of calcium in its octahedral crystal structure. This term also includes the acidic form of Y which may also be represented as "H—Y."

The term "zeolite" is defined as in the International Zeolite Association Constitution (Section 1.3) to include both natural and synthetic zeolites as well as molecular sieves and other microporous and mesoporous materials having related properties and/or structures. The term "zeolite" also refers to a group, or any member of a group, of structured aluminosilicate minerals comprising cations such as sodium and calcium or, less commonly, barium, beryllium, lithium, potassium, magnesium and strontium; characterized by the ratio (Al+Si):O=approximately 1:2, an open tetrahedral framework structure capable of ion exchange, and loosely held water molecules that allow reversible dehydration. The term "zeolite" also includes "zeolite-related materials" or "zeotypes" which are prepared by replacing $Si^{4+}$ or $Al^{3+}$ with other elements as in the case of aluminophosphates (e.g., MeAPO, SAPO, ElAPO, MeAPSO, and ElAPSO), gallophosphates, zincophophates, titanosilicates, etc.

"ZSM-5" or "ZSM-5 (MFI)" represents a Mobil synthetic zeolite-5. This term also includes the acidic form of ZSM-5 which may also be represented as "H-ZSM-5." The (MFI) relates to its structure.

A comprehensive list of the abbreviations utilized by organic chemists of ordinary skill in the art appears in the first issue of each volume of the *Journal of Organic Chemistry*; this list is typically presented in a table entitled Standard List of Abbreviations.

For purposes of this invention, the chemical elements are identified in accordance with the Periodic Table of the Elements, CAS version, Handbook of Chemistry and Physics, 67th Ed., 1986-87, inside cover.

Contemplated equivalents of the zeolitic structures, subunits and other compositions described above include such materials which otherwise correspond thereto, and which have the same general properties thereof (e.g., biocompatible), wherein one or more simple variations of substituents are made which do not adversely affect the efficacy of such molecule to achieve its intended purpose. In general, the compounds of the present invention may be prepared by the methods illustrated in the general reaction schemes as, for example, described below, or by modifications thereof, using readily available starting materials, reagents and conventional synthesis procedures. In these reactions, it is also possible to make use of variants which are in themselves known, but are not mentioned here.

Synthesis of Fully Crystalline Mesostructured Zeolites

In recent years, expertise has been gained in the synthesis of zeolites with desired properties by the choice of the organic molecule used as structure directing agent (SDA), control of the synthesis conditions, and post-synthesis treatments. van Bekkum, H., Flanigen, E. M., Jacobs, P. A., Jansen, J. C. (editors) Introduction to Zeolite Science and Practice, 2nd edition. Studies in Surface Science and Catalysis, 2001, 137; Corma, A., *Chem. Rev.*, 1997, 97, 2373-2419; Davis, M. E., *Nature*, 2002, 417, 813-821; Davis, M. E., et al., *Chem. Mater.*, 1992, 4, 756-768; de Moor P-P. E. A. et al., *Chem. Eur. J*, 1999, 5(7), 2083-2088; Galo, J. de A. A., et al., *Chem. Rev.*, 2002, 102, 4093-4138. At the same time, the family of ordered mesoporous materials has been greatly expanded by the use of different surfactants and synthesis conditions. Corma, A., *Chem. Rev.*, 1997, 97, 2373-2419; Davis, M. E., *Nature*, 2002, 417, 813-821; Galo, J. de A. A., et al., *Chem. Rev.*, 2002, 102, 4093-4138; Ying, J. Y., et al., *Angew. Chem. Int. Ed.*, 1999, 38, 56-77. The family of fully crystalline mesostructured zeolites disclosed herein is a one-phase hybrid material consisting of a zeolitic structure with controlled mesoporosity, which bridges the gap between crystalline microporous and amorphous mesoporous materials. In accordance with the instant invention, a surfactant is employed to penetrate a fully crystalline zeolite structure forming pores, more specifically, forming a plurality of mesopores throughout at least a portion of the volume of the fully crystalline zeolite structure. An mesopore surface surrounds each mesopore within the mesostructure. Full crystallinity includes all solids with one or more phases including having repeating structures, referred to as unit cells, that repeat in a space for at least 10 nm. A fully crystalline zeolite structure may have, for example, single crystallinity, mono crystallinity, or multi crystallinity. Multi crystallinity includes all solids having more than one phase having repeating structures, referred to as unit cells, that repeat in a space for at least 10 nm. A fully crystalline zeolite is exposed to the surfactant, for a time, under temperature, and pH conditions suitable to achieve a desired mesopore structure throughout all or a portion of the volume of the fully crystalline zeolite. It is expected that any fully crystalline inorganic material would have a similar structure, would similarly be produced, and/or would similarly be employed where, for example, a zeolite, a fully crystalline zeolite, or zeolites are described.

Figure 1A:
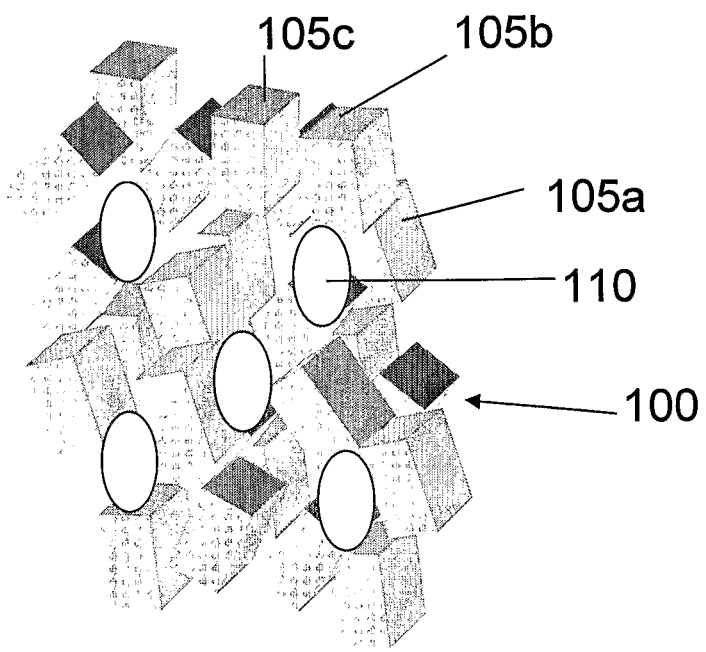
FIG. 1A is a schematic diagram of a prior art polycrystalline mesoporous material.
Figure 1B:
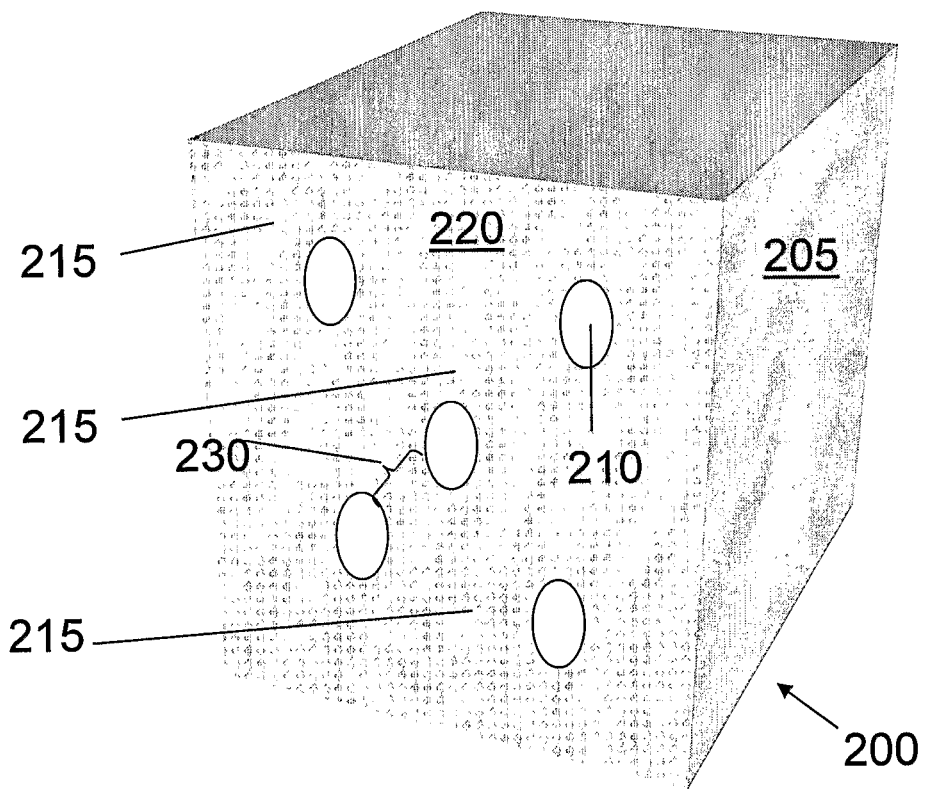
FIG. 1B is a schematic illustration of a fully crystalline mesostructured zeolite of the present invention.

In contrast with FIG. 1A, FIG. 1B is a schematic illustration of a fully crystalline mesostructured zeolite 200 of the instant invention, which features a fully crystalline zeolite structure 205 with mesopores 210 penetrating throughout the volume of the zeolite structure 205. The mesostructure 215 that surrounds the mesopores 210 is fully crystalline. The pore wall or interior wall between adjacent mesopores has a wall thickness 230. As illustrated in FIG. 1B, the mesostructure 215 and the mesopores 210 are viewed from a side 220 of the zeolite structure 205. Although not depicted in this schematic illustration, the mesostructure and the mesopores can be viewed from other sides of the mesostructured zeolite 200.

Referring now to FIGS. 1A and 1B, unlike the fully crystalline mesostructure 215 of the fully crystalline mesostructured zeolite 200 of the instant invention, in the aggregated crystalline mesoporous zeolite nuclei material 100, the pore walls that surround the mesopore-sized pore volume 110 are discontinuous, featuring multiple zeolite nuclei crystals e.g., 105a, 105b, 105c.

The synthesis of fully crystalline mesostructured zeolites is applicable to a wide variety of materials. The first strategy is based on the short-range reorganization of a zeolite structure in the presence of a surfactant to accommodate mesoporosity without loss of zeolitic full crystallinity. A zeolite is added to a pH controlled solution containing a surfactant. Alternatively, a zeolite is added to a pH controlled solution and thereafter a surfactant is added. The pH controlled solution can be, for example, a basic solution with a pH ranging from about 8 to about 12, or from about 9 to about 11, or alternatively, the basic solution pH can be about 10. The strength of the base and the concentration of the basic solution are selected to provide a pH within the desired range. Any suitable base can be employed that falls within the desired pH range.

Suitable surfactants that can be employed in accordance with the invention include cationic, ionic, neutral surfactants and/or combinations. The quantity of surfactant is varied according to, for example, the surfactant and the zeolite that are mixed. For example, in one embodiment, the weight of surfactant is about equal to the weight of zeolite added to the solution. Alternatively, the weight of surfactant can be about half of the weight of zeolite added to the solution.

The mixture is hydrothermally treated for a period of time that is selected to allow the fully crystalline zeolite to achieve a desired mesostructure, for example, a H—Y[MCM-41] is a fully crystalline acidic form of faujasite having a fully crystalline mesostructure surrounding a hexagonal pore arrangement. Similarly, a H—Y[CM-48] is a fully crystalline acidic form of faujasite having a fully crystalline mesostructure surrounding a cubic pore arrangement, and a H—Y[MCM-50] is a fully crystalline acidic form of faujasite having a having a fully crystalline mesostructure surrounding a lamellar pore arrangement, etc. Generally, the time and temperature are related such that a higher temperature requires a shorter period of time to achieve a desired mesoporosity and a certain mesostructure as compared to a lower temperature, which would require a relatively longer period of time to achieve the same mesoporosity. Because time and temperature are related, any suitable combination of time and temperature may be employed when hydrothermally treating the mixture. For example, the temperature ranges from about room temperature to about 60° C., alternatively, the temperature ranges from 100 to about 200° C. Where the temperature is about 60° C. or greater, the controlled temperature conditions take place under hydrothermal conditions, for example, in a sealed reactor. The time ranges from about one hour to about two weeks.

In two synthesis experiments, the parameters of time, temperature, zeolite type and quantity, and surfactant type and quantity are kept constant, however, the pH in the first synthesis is 9 and the pH in the second synthesis is 11. As a result of the different pH values in the two synthesis experiments, the two fully crystalline zeolite mesostructures differ from one another. Specifically, the fully crystalline zeolite mesostructure synthesized with the 9 pH solution features fewer mesopore surfaces, because fewer mesopores were incorporated into the conventional fully crystalline zeolite, compared to the fully crystalline zeolite mesostructure synthesized with the 11 pH, which has more mesopore surfaces, because the higher base concentration resulted in increased mesoporosity.

In an exemplary synthesis, a zeolite is added to a diluted $NH_4OH$ solution containing cetyltrimethylammonium bromide (CTAB) surfactants. The mixture is hydrothermally treated at about 100 to about 200° C., about 120 to about 180° C., about 140 to about 160° C., or about 150° C. for about 20 hr or overnight during which the zeolite structure undergoes short-range rearrangements to accommodate the MCM-41 type of mesostructure. Higher surfactant concentrations and longer hydrothermal treatments would produce mesostructured zeolites with the MCM-48 type of mesostructure. After washing and drying, the surfactant is removed by, for example, calcination or surfactant extraction. In one embodiment, the resulting material is calcined in $N_2$ at a maximum temperature from about 500 to 600° C., or at about 550° C.; and then in air for surfactant removal. The surfactant removal technique is selected based, for example, on the time needed to remove all of the surfactant from the mesostructured zeolites. This synthetic scheme could be used to produce mesostructured zeolites with various zeolitic structures.

Without being bound to any one theory, it is believed that the controlled pH solution softens the conventional fully crystalline zeolite surface enabling the surfactant to penetrate the zeolite creating the mesostructured zeolite. More specifically, the pH conditions that are employed enable the surfactant to penetrate the structure of the zeolite however the pH conditions do not dissolve the zeolite. As the surfactant penetrates the zeolite, forming mesopores, the penetrated portion is exposed to the controlled pH solution and is softened, enabling further penetration by the surfactant. The penetration continues in this fashion throughout the volume of the zeolite. The penetration through the zeolite volume may be in any single direction or in a combination of directions, for example, the penetration may be through the x direction, the y direction, the z direction, or any combination thereof. The penetration direction or rate is not necessarily linear. Penetration may be ordered or optionally the penetration and consequently the mesopores may be disordered or random. Optionally, one or more of the mesopores intersect, interconnect, converge, and/or align, which impacts the arrangement of the resulting mesoporous fully crystalline mesostructure. The surfactant enables penetration into the fully crystalline zeolite, creating mesopores. The type of surfactant determines, at least in part, the size of the mesopore including, for example, the size of the mesopore diameter and/or the size of the mesopore cross section. Penetration into the conventional fully crystalline zeolite is not observed where a controlled pH solution, for example, a base having a pH of 10, held at controlled time and temperature conditions is mixed with a zeolite without a surfactant.

Certain conventional fully crystalline zeolites are very stable (e.g., ZSM-5, MOR, CHA etc.) and it is difficult to incorporate mesoporosity into these zeolites. In such cases, strong base having, for example, a pH ranging from about 11 to about 14, or from about 12 to about 13, or an acid, for example, HF having, for example, a pH ranging from about 2 to about 6, or from about 3 to about 5, or at about 4, is necessary to dissolve silica and soften the conventional fully crystalline zeolite surface to enable the surfactant to penetrate and create mesopores through the fully crystalline zeolite.

Conventional fully crystalline zeolites with a dense structure (e.g. ZSM-5) are more resistant to acids and basis relative to fully crystalline zeolites with less dense structures. Zeolites with a low solubility (e.g. ZSM-5) and/or a dense structure are relatively stable with respect to penetration by acids and bases, accordingly, a diluted tetramethyl ammonium hydroxide (TMA-OH) having a pH ranging from about 10 to about 14 or a solution of acid, for example hydrofluoric acid, HF, having a pH ranging from about 2 to about 6 can be used instead of a dilute $NH_4OH$ solution, having a pH ranging from about 9 to about 10, in the synthesis scheme. More specifically, base treatment alone, even at very high pH, is not sufficient to soften some of the very stable zeolites. The acid HF dissolves silica and softens the structure of the densely structured conventional fully crystalline zeolite (e.g., ZSM-5). After softening the conventional fully crystalline zeolite by exposing it to HF, the pH is increased by including a base solution having a pH from about 9 to about 11 and a suitable surfactant is added in a quantity selected according to, for example, the quantity of zeolite and the desired mesoporosity volume. The mixture is exposed to appropriate time and temperature conditions to provide the desired mesoporosity and resulting mesostructure in a fully crystalline mesostructured zeolite.

In another exemplary synthesis, a fully crystalline zeolite is added to an acid solution having a pH from about −2 to about 2, or from about −1 to about 1, or at about 0, containing a neutral surfactant, for example, PLURONIC(C) (available from BASF (Florham Park, N.J.). The mixture is exposed to appropriate temperature conditions for a period of time selected to achieve a desired mesostructure. The mixture can be held at room temperature and stirred for from about 1 day to about 1 week. Alternatively, the mixture is hydrothermally treated. In one embodiment, the mixture is hydrothermally treated at about 120° C. for from about 4 hours to about 1 week. The resulting mesopores having a pore diameter measuring from about 5 to 60 nm. An mesopore surface surrounds each mesopore of the mesostructure.

The mesopore size and architecture may also be conveniently tuned by well-known techniques, such as the use of surfactants with different aliphatic chain lengths, non-ionic surfactants, triblock copolymers, swelling agents, etc. For example, use of a surfactant with longer chain length increases pore size and conversely, use of surfactant with a shorter chain length decreases pore size. For example, use of a swelling agent will expand the surfactant micelles. Any of these mesopore size and mesostructure architecture altering properties may be used either alone or in combination. Also, post-synthesis treatments (e.g., silanation, grafting, surface functionalization, ion-exchange, immobilization of homogeneous catalysts and deposition of metal nanoclusters) could be employed to further improve the textural properties of the materials and/or modify their surface chemistry.

Figure 1C:
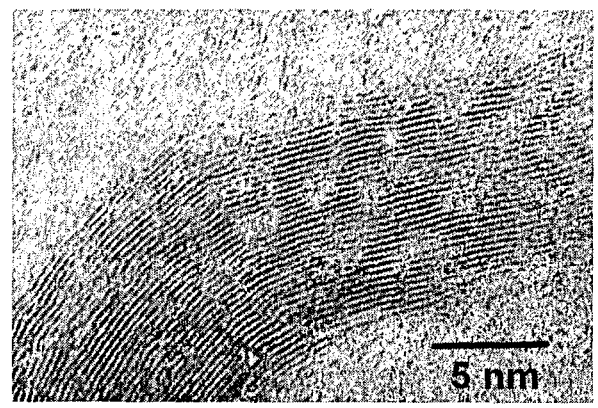
FIG. 1C depicts a TEM image of a nanosostructured zeolite of the present invention where the nanostructure shape includes nanorods.

Another aspect of the invention features mesostructures, e.g., as illustrated in FIG. 1C. Such mesostructures can be achieved based on the dissolution of a zeolite in a pH controlled medium, either in an acidic or basic medium, followed by hydrothermal treatment in the presence of a surfactant. Suitable surfactants that may be employed include cationic, ionic, neutral surfactants, and/or combinations of the cationic, ionic, and neutral surfactants. The quantity of surfactant is varied according to, for example, the selected surfactant and the selected zeolite. For example, the weight of surfactant can be about equal to the weight of zeolite added to the solution, alternatively, the weight of surfactant can be about half of the weight of zeolite added to the solution. Where the pH controlled medium is basic, the pH that dissolves the zeolite ranges from about 10 to about 14. Where the pH controlled medium is acidic, the pH that dissolves the zeolite ranges from about −2 to about 2, when using HF, the pH range is from about 2 to about 6. Under these more extreme pH conditions, a mesoporous solid was obtained wherein the pore walls were initially amorphous. The pore walls can later be transformed to a zeolitic phase, with or without affecting the mesoporous structure. More specifically, after the zeolite is exposed to this aggressive pH treatment, the pH is adjusted to about 10 by adding, for example $NH_4OH$, and surfactant (e.g., CTAB) to produce self-assembling partially dissolved zeolites. This synthesis mixture can be hydrothermally treated or stirred at room temperature over a period of time to obtain a highly stable mesoporous amorphous aluminosilicate. More specifically, if the synthesis mixture is hydrothermally treated at, for example, from about 100 to about 150° C., a highly stable mesoporous amorphous aluminosilicate is obtained. Alternatively, the synthesis mixture is stirred at room temperature for sufficient time (from about 4 hours to about 1 day) to obtain a highly stable mesoporous amorphous aluminosilicate. The mesoporous amorphous aluminosilicate maintains its mesoporosity after boiling for 48 hours under reflux conditions. The acidity of the material produced is higher than that of amorphous mesoporous materials obtained from non-zeolitic silica and alumina sources. Where the synthesis mixture is hydrothermally treated for a longer period of time (from about 12 hours to about 2 weeks) a zeolitic mesostructure is obtained. By adjusting the synthesis conditions (e.g., pH, time, temperature, zeolite type, surfactant concentration) different zeolite nanostructures, for example, nanotubes, nanorings, nanorods, nanowires, nanoslabs, nanofibers, nanodiscs, etc. can be produced. Referring again to FIG. 1C, a nanostructure including, for example, nanorods is made from adjacent members (e.g., a first nanorod adjacent a second nanorod). Voids can be formed between adjacent members (e.g., adjacent nanorods). Each nanostructure member defines a plurality of pores (e.g., each nanorod has pores in its structure). Different members can join together within a single nanostructure, for example, a nanorod may be adjacent a nanoring.

Zeolitic nanorods (ZNRS) have been prepared by this approach in three steps: (i) basic treatment of a zeolite in a pH controlled medium to partially dissolve the zeolite and produce a suspension of amorphous aluminosilicate, (ii) pH adjustment and surfactant addition to produce MCM-41, and (iii) hydrothermal treatment of the resulting solid at a temperature typically ranging from about 100 to about 200° C. for from about 12 hours to about 2 weeks. During the last step, the MCM-41 (the hexagonal pore arrangement) mesostructure is first transformed to MCM-48 (the cubic pore arrangement) and is then transformed to MCM-50 (the lamellar pore arrangement), while the amorphous pore walls are transformed to a crystalline zeolitic phase. MCM-50 is a lamellar structure and is a precursor to zeolitic nanostructures including, for example, nanotubes, nanorings, nanorods, nanowires, nanoslabs, etc. The specific nanostructure formed by using steps (i)-(iii) is determined by the selected zeolite, surfactant, temperature, time, and pH. The zeolite and other conditions can be selected to achieve a single nanostructure shape (e.g., all nanorod) or, alternatively, multiple nanostructure shapes. Without being bound to any single theory, it appears that nanostructures are achieved, at least in part, because the zeolite dissolved by a pH controlled solution into a suspension of amorphous aluminosilicate retains some degree of the zeolitic connectivity that is characteristic of a zeolite starting material. It is expected that some of the IR spectra bands characteristic of zeolites remain present in the dissolved solution, i.e., in the suspension of amorphous aluminosilicate. In contrast, if rather than dissolving a zeolite to produce a suspension of amorphous aluminosilicate an alumina, a silica, or an amorphous aluminosilicate were exposed to steps (ii)-(iii), described above, the nanostructure fails to form. The building blocks of connectivity present in dissolved zeolite solution appear to play a part in forming nanostructures.

Although the nanostructures are crystalline they are not fully crystalline. They have a few units in one direction and are semi crystalline or are polycrystalline. Semi crystalline and polycrystalline refers to, for example, nanosized crystals, crystal nuclei, or crystallites that, for example, aggregate to form a solid. Unit cells are the simplest repeating unit in a crystalline structure or crystalline material. Nanostructures have an open structure. They have a high surface area due to an extended structure in the space as well as due to spaces between multiple structures or voids within the structures themselves. Generally, these nanostructures also have a high external surface area. In one embodiment, one nanostructure is adjacent another nanostructure. FIG. 1C depicts a TEM image of a nanosostructured zeolite of the present invention where the nanostructure shape includes nanorods. The nanorods have a thickness measuring about 5 nm. As depicted, the nanorods sit adjacent one another and the nanorods curve. The background of the curved rods seen in the TEM image is noise and it should be ignored.

Zeolite-like materials, which represent a growing family of inorganic and organic/inorganic molecular sieves, may also be used as precursors for the synthesis of mesostructured zeolites, since the synthetic approaches described above may be adapted for a wide variety of materials.

The mesostructured zeolites and methods of making the mesostructured zeolites of the instant invention utilize available, inexpensive, non-toxic, non-waste producing materials. Previous attempts an improved porosity in zeolites required more steps, exercised limited control on the final structure, and employed more expensive and toxic materials. The method improves on the material cost and production efficiency of prior art processes, requiring fewer steps to achieve improved porosity in zeolites. In addition, the methods of the invention produce fully crystalline mesostructured zeolites. The methods of the invention also produce nanostructured zeolites having a high surface area.

Structure of Mesostructured Zeolites

The hybrid structure of the mesostructured zeolites was studied via XRD. FIGS. 1D-3 show the XRD patterns of H—Y[MCM-41], H-MOR[MCM-41], and H-ZSM-5-[MCM-41], respectively. As used herein, the naming convention for mesostructured zeolites, e.g., H—Y[MCM-41] first includes the starting zeolite structure, e.g., H—Y and then, placed adjacent, in brackets, is the name of the mesostructure, e.g., [MCM-41]. The mesostructured zeolite H—Y[MCM-41] retains the full crystallinity of the zeolite H—Y, and features hexagonal pores [MCM-41]. The fully crystalline mesostructure surrounds these hexagonal mesopores that have been formed by the invention. Thus, the resulting structure is a fully crystalline H—Y material that features an [MCM-41] type of mesostructure. For convenience, this is designated as H—Y[MCM-41].

Figure 1D:
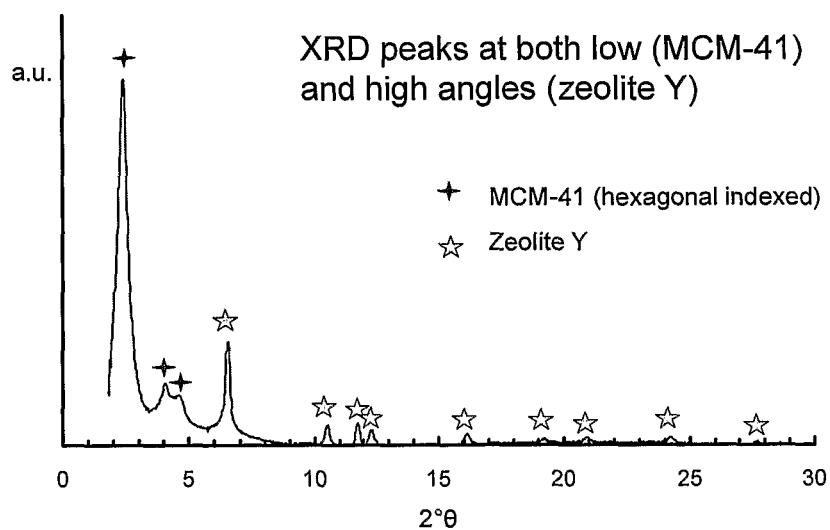
FIG. 1D depicts the X-ray diffraction pattern of the fully crystalline mesostructured zeolite H—Y[MCM-41]. Both the ordered mesostructure MCM-41 (revealed by the XRD peaks at low angles) and the unmodified zeolitic fully crystalline structure H—Y are present.
Figure 2:
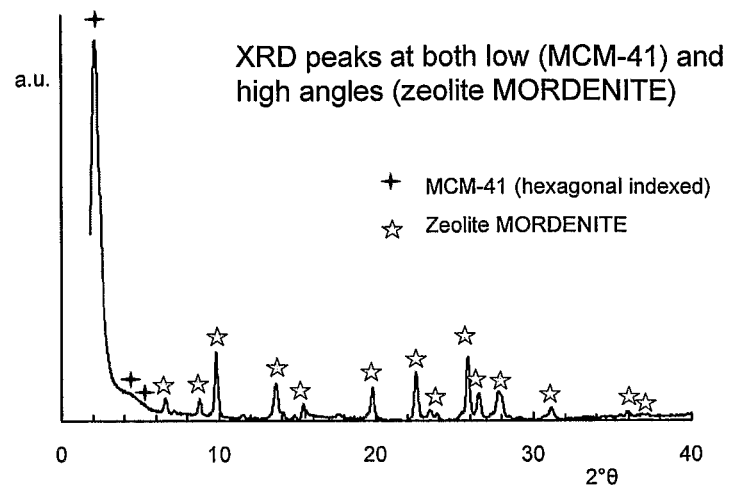
FIG. 2 depicts the X-ray diffraction pattern of the fully crystalline mesostructured zeolite H-MOR[MCM-41]. Both the ordered mesostructure MCM-41 (revealed by the XRD peaks at low angles) and the unmodified zeolitic fully crystalline structure H-MOR are present.
Figure 3:
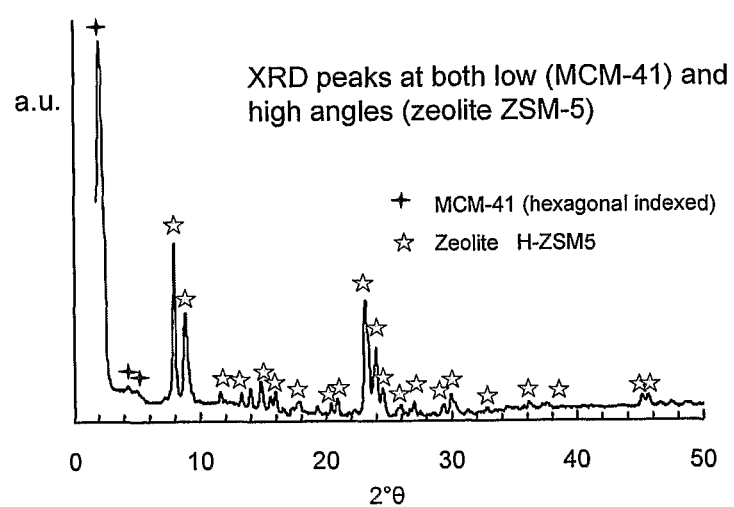
FIG. 3 depicts the X-ray diffraction pattern of the fully crystalline mesostructured zeolite H-ZSM-5-[MCM-41]. Both the ordered mesostructure MCM-41 (revealed by the XRD peaks at low angles) and the unmodified zeolitic crystalline structure H-ZSM-5 are present.

FIG. 1D depicts the X-ray diffraction pattern of the mesostructured zeolite H—Y[MCM-41] and both the ordered mesostructure MCM-41 (revealed by the XRD peaks at low angles) and the zeolitic fully crystalline structure H—Y are present. FIG. 2 depicts the X-ray diffraction pattern of the mesostructured zeolite H-MOR[MCM-41] and both the ordered mesostructure MCM-41 (revealed by the XRD peaks at low angles) and the zeolitic crystalline structure H-MOR are present. FIG. 3 depicts the X-ray diffraction pattern of the mesostructured zeolite H-ZSM-5-[MCM-41] and both the ordered mesostructure MCM-41 (revealed by the XRD peaks at low angles) and the zeolitic crystalline structure H-ZSM-5 are present. Referring now to FIGS. 1D-3, very intense peaks, both at low and high 2θ values reveal both the ordered mesostructure and the zeolitic crystallinity of this family of materials. In all cases, the peaks at low 2θ values can be indexed to hexagonal symmetry indicating the presence of MCM-41, whereas the well-defined XRD peaks at high 2θ° values correspond, respectively, to the zeolites Y, MOR and ZSM-5. This observation is remarkable since no long-range crystallinity has been previously observed in mesoporous metal oxides and only semicrystallinity (due to the presence of zeolite nanoclusters) has been achieved in thick-wall mesoporous materials prepared using triblock copolymers. Kloetstra, K. R., et al., *Chem. Commun*, 1997, 23, 2281-2282; Liu, Y. et al., *Angew. Chem. Int. Ed.* 2001, 7, 1255-1258; On, D. T., et al., *Angew. Chem. Int. Ed.*, 2001, 17, 3248-3251.

Figure 4:
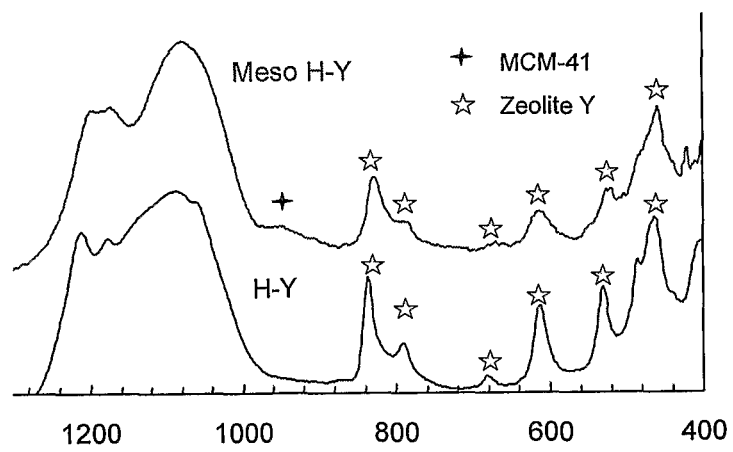
FIG. 4 depicts FTIR characterization peaks for the fully crystalline mesostructured zeolite H—Y[MCM-41], labeled Meso-H—Y, and the unmodified zeolite Y.
Figure 5:
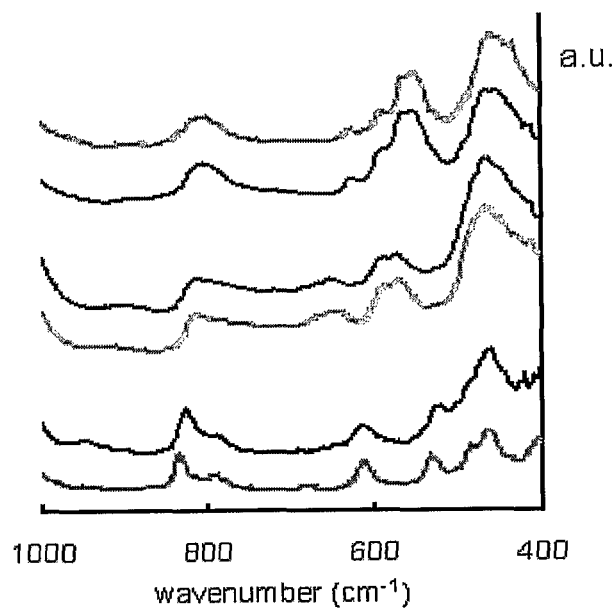
FIG. 5 depicts FTIR spectra of the fully crystalline mesostructured zeolites H—Y[MCM-41] (upper top), H-MOR [MCM-41] (upper middle), H-ZSM-5-[MCM-41] (upper bottom) and FTIR spectra of their unmodified fully crystalline zeolitic versions H—Y (lower top), H-MOR (lower middle), H-ZSM-5 (lower bottom). A match between each fully crystalline mesostructured zeolite and its corresponding unmodified zeolite is observed, indicating the fully zeolitic connectivity present in the fully crystalline mesostructured zeolites.

The connectivity of the mesostructured zeolites was studied by infrared spectroscopy (FTIR) (See FIGS. 4-5). FIG. 4 depicts FTIR characterization peaks for the fully crystalline mesostructured zeolite H—Y[MCM-41], labeled Meso-H—Y, and zeolite Y. Referring still to FIG. 4, the FTIR spectra of the fully crystalline mesostructured zeolite H—Y[MCM-41], labeled Meso-H—Y, is on the top and the FTIR spectra of the unmodified conventional fully crystalline zeolite H—Y is on the bottom. FIG. 5 depicts FTIR spectra of H—Y[MCM-41] (upper top), H-MOR[MCM-41] (upper middle), H-ZSM-5-[MCM-41] (upper bottom) and FTIR spectra of their fully crystalline zeolitic versions in conventional, unmodified form, H—Y (lower top), H-MOR (lower middle), H-ZSM-5 (lower bottom). The spectra of the fully crystalline mesostructured zeolite H—Y[MCM-41] is the upper top spectra and the spectra of the unmodified fully crystalline zeolite H—Y is the lower top spectra. The spectra of the fully crystalline mesostructured zeolite H-MOR[MCM-41] is the upper middle spectra and the spectra of the unmodified fully crystalline zeolite H-MOR is the lower middle spectra. The spectra of the fully crystalline mesostructured zeolite H-ZSM-5 [MCM-41] is the upper bottom spectra and the spectra of the unmodified fully crystalline zeolite H-ZSM-5 is the lower bottom spectra. In FIG. 5 a match between each fully crystalline mesostructured zeolite and its corresponding unmodified fully crystalline zeolite is observed, indicating the zeolitic connectivity is present in fully crystalline mesostructured zeolites.

FIG. 5 shows a remarkable match between the IR spectra of the fully crystalline mesostructured zeolites H—Y[MCM-41], H-MOR[MCM-41], and H-ZSM-5-[MCM-41] and those of the their corresponding unmodified fully crystalline zeolitic versions, H—Y, H-MOR, H-ZSM-5, contrary to highly stable Al-MCM-41, which presents only one IR broad peak, due to imperfect zeolitic connectivity. Liu, Y., Pinnavaia, T. J., *J. Mater. Chem.*, 2002, 12, 3179-3190; Kloetstra, K. R., et al., *Chem. Commun*, 1997, 23, 2281-2282; Liu, Y. et al., *Angew. Chem. Int. Ed.*, 2001, 7, 1255-1258. The peak at 960 cm$^{-1}$ in the H—Y[MCM-41] mesostructured zeolite sample, characteristic of silanol groups on the wall surfaces, is an additional evidence of the mesoporous/zeolitic hybrid nature of mesostructured zeolites. Geidel, E., et al., *Microporous and Mesoporous Materials*, 2003, 65, 31-42.

Figure 6:
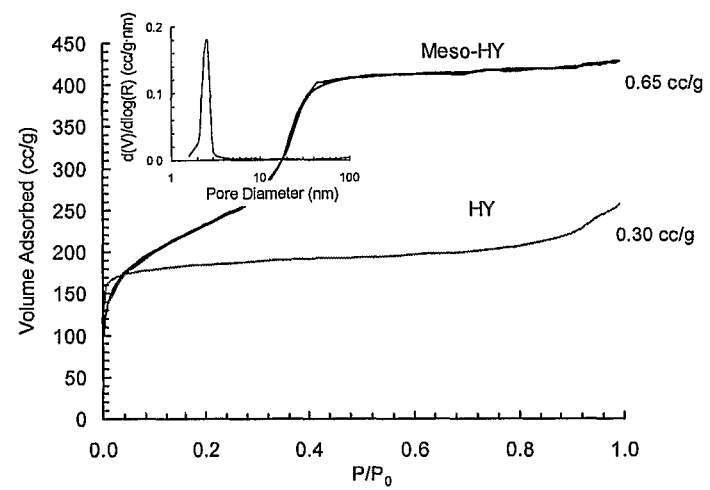
FIG. 6 depicts the physisorption isotherm of $N_2$ at 77 K of the fully crystalline mesostructured zeolite H—Y[MCM-41], labeled Meso-H—Y, and its unmodified zeolitic version, H—Y. The pore size distribution (BJH method) of the fully crystalline mesostructured zeolite is included in inset. The presence of well developed narrow pore size mesoporosity in the mesostructured sample is evident by the sharp uptake at $P/P_0 \sim 0.3$.
Figure 7:
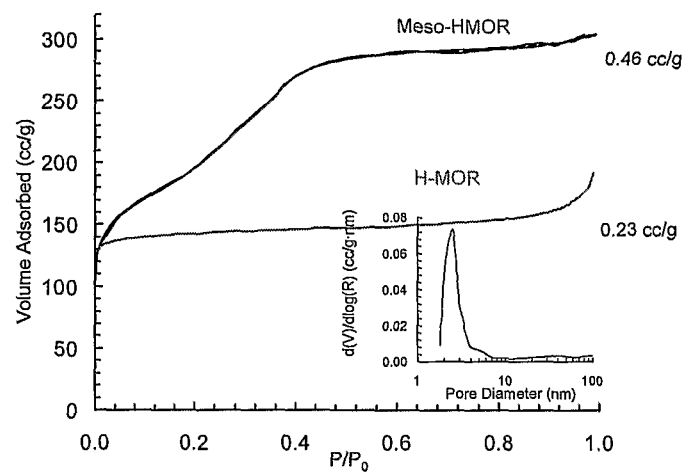
FIG. 7 depicts the physisorption isotherm of $N_2$ at 77 K of the fully crystalline mesostructured zeolite H-MOR[MCM-41], labeled Meso-H-MOR, and its unmodified zeolitic version, H-MOR. The pore size distribution (BJH method) of the fully crystalline mesostructured zeolite is included in inset. The presence of well developed narrow pore size mesoporosity in the mesostructured sample is evident by the sharp uptake at $P/P_0 \sim 0.3$.
Figure 8:
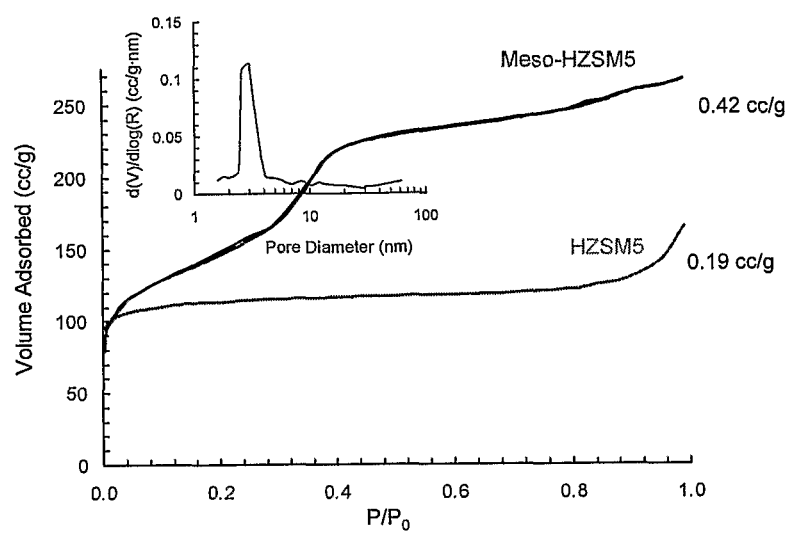
FIG. 8 depicts the physisorption isotherm of $N_2$ at 77 K of the fully crystalline mesostructured H-ZSM-5-[MCM-41], labeled Meso-H-ZSM-5, and its unmodified zeolitic version, H-ZSM-5. The pore size distribution (BJH method) of the fully crystalline mesostructured zeolite is included in inset. The presence of well developed narrow pore size mesoporosity in the mesostructured sample is evident by the sharp uptake at $P/P_0 \sim 0.3$.

The presence of well-defined mesoporosity in mesostructured zeolites can be suitably studied by nitrogen physisorption at 77 K. Storck, S., et al., *Applied Catalysis A: General*, 1998, 17, 137-146. FIGS. 6-8 show the nitrogen isotherms at 77 K of the fully crystalline mesostructured zeolites, H—Y [MCM-41], H-MOR[MCM-41], and H-ZSM-5 [MCM-41], respectively, and their unmodified zeolitic versions, H—Y, H-MOR, and H-ZSM-5. The presence of well developed narrow pore size diameter distribution mesoporosity is evident in each mesostructured sample. The pore size of the mesoporosity is controlled such that a diameter and or a cross sectional area of each of the mesopores in a specific fully crystalline mesostructured zeolite fall within a narrow pore size diameter distribution. In accordance with the fully crystalline mesostructured zeolites of the invention, in one embodiment, more than 95% of the mesopores has a pore size (e.g., a diameter and/or a cross sectional area) that falls within plus or minus 10% of the average pore size. In another embodiment, more than 95% of the mesopores has a pore size (e.g., a diameter and/or a cross sectional area) that falls within plus or minus 30% of the average pore size. In still another embodiment, more than 95% of the mesopores has a pore size (e.g., a diameter and/or a cross sectional area) that falls within plus or minus 75% of the average pore size. Each pore wall or mesopore surface that surrounds a diameter controlled mesopore is substantially similar in size. The fully crystalline mesostructured zeolites of the invention have controlled mesoporosity pore size cross sectional area. Where the mesopores are substantially cylindrical in shape in addition to having a pore size cross sectional area these pores have a pore size diameter. However, where the shape of the mesopores are not cylinder like and are, for example, slit shaped, worm-like, e.g., with a changing diameter throughout at least a portion of the depth of the mesopore surface that surrounds an exemplary mesopore, or non defined shapes then at least a portion of such a mesopore surface has a controlled mesopore cross sectional area. The size of the mesopores is controlled by, for example, the selected surfactant and/or quantity of surfactant used when making a fully crystalline mesostructured zeolite from a conventional unmodified fully crystalline zeolite. Prior attempts to incorporate mesostructures into zeolites have been unable to achieve such a controlled mesoporosity that result in substantially all mesopores in a zeolite having a substantially similar size (e.g., diameter and/or cross sectional area) and a controlled pore arrangement (e.g., [MCM-41] having a hexagonal pore arrangement). Rather, prior attempts to form mesostructures in zeolites result in any or a combination of a broader pore size distribution ranging from small, medium, to large size pores, different shaped pores, and uncontrolled arrangements.

Figure 9:
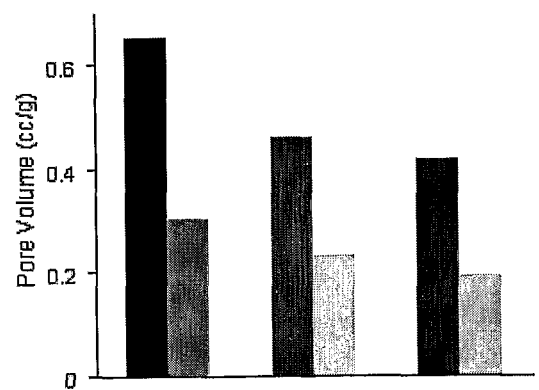
FIG. 9 depicts pore volumes (darker columns) of fully crystalline mesostructured zeolites H—Y[MCM-41] (left), H-MOR[MCM-41] (center), and H-ZSM-5-[MCM-41] (right) and their unmodified zeolitic versions (lighter columns) of H—Y (left), H-MOR (center), and H-ZSM-5 (right).

A significant volume of mesoporosity can be introduced into the sample. For example, referring to FIG. 6, the mesopore volume roughly doubles when the zeolite is mesostructured. In accordance with principles of the invention, in this example, the unmodified zeolite H—Y had a mesopore volume of 30 cc/g whereas the fully crystalline mesostructured zeolite labeled Meso-HY, which is HY[MCM-41], has a mesopore volume of 0.65 cc/g. Conventional zeolites adsorb nitrogen only at low pressures, producing type I isotherms that are characteristic of microporous materials. Storck, S., et al., *Applied Catalysis A: General*, 1998, 17, 137-146. However, the fully crystalline mesostructured zeolites of the invention show sharp nitrogen uptakes at higher partial pressures ($P/P_0$~0.3), which is a characteristic feature of mesostructured materials with narrow pore-size distribution (pore diameter~2.5 nm). Storck, S., et al., *Applied Catalysis A: General*, 1998, 17, 137-146. FIGS. 6-8 show similar results for fully crystalline mesostructured zeolites H—Y[MCM-41], H-MOR[MCM-41], and H-ZSM-5-[MCM-41] and their unmodified conventional zeolitic versions H—Y, H-MOR, and H-ZSM-5. FIG. 9 depicts mesostructured zeolite pore volumes (darker columns) of H—Y[MCM-41] (left), H-MOR[MCM-41] (center), and H-ZSM-5 [MCM-41] (right) and their zeolitic versions (lighter columns) of H—Y (left), H-MOR (center), and H-ZSM-5 (right). Compared to conventional zeolites, the fully crystalline mesostructured zeolites of the invention have more than double the pore volume (see FIG. 9) due to the incorporation of a well-developed, narrow distribution of pore-size diameter mesoporosity. Referring still to FIG. 9, the volume of mesoporosity that is incorporated can be controlled. The fully crystalline mesostructured zeolite mesoporosity volume is controlled by, for example, the quantity of surfactant added as a percentage of the quantity of zeolite. Other factors that contribute to mesoporosity volume include the pH, time, and temperature conditions employed. In one embodiment, the volume of the controlled pH medium that is added is an amount suitable to achieve the desired surfactant concentration in view of the amount of zeolite. The pore volume is expressed in cc/g, the cubic centimeters of pores over the grams of the zeolite. The fully crystalline mesostructured zeolite pore volume may range from about 0.05 cc/g to about 2 cc/g, or from about 0.5 cc/g to about 1 cc/g. The mesopore size is controlled and the mesopore volume is controlled by the type and the quantity of surfactant used to create the zeolite mesostructure from the zeolite. The time and temperature conditions also contribute to the mesopore size and/or the mesopore volume.

The mesostructured zeolites have sharper uptake at low partial pressures, which indicates the presence of microporosity, and slightly higher pore size. As well known in surfactant-templated mesoporous solids synthesis, the size of the mesopore in mesostructured zeolites can be easily tuned or controlled by changing the length of the aliphatic chain of the surfactant. Corma, A., *Chem. Rev.* 1997, 97, 2373-2419; Linssen, T., Cassiers, K., Cool, P., Vansant, E. F., *Advances in Colloid and Interface Science*, 2003, 103, 121-147; Ying, J. Y., et al., *Angew. Chem. Int. Ed.*, 1999, 38, 56-77. Optionally, the mesopore pore size diameter can also be controlled by, for example, the choice of surfactant and/or the quantity of the surfactant.

Previous attempts by others to prepare zeolitic mesostructured materials led to phase separation into zeolite and amorphous mesoporous solids. Karlsson, A., et al., *Microporous and Mesoporous Materials*, 1999, 27, 181-192; Huang L., et al., *J. Phys. Chem. B.* 2000, 104, 2817-2823. Moreover, some authors pointed out the difficulty of making thin-walled mesoporous materials, such as MCM-41, with zeolitic walls, due to surface tension caused by the high curvature of the structure. Yang, P., et al., *Nature*, 1998, 396, 152-155.

In one aspect of the invention, a fully crystalline mesostructured zeolite is produced, as described above, by exposing a conventional zeolite to a suitable pH controlled solution containing a suitable concentration of a selected surfactant under time and temperature conditions desired to obtain the a desired mesopore size and mesopore volume. The fully crystalline mesostructured zeolite retains substantially the same exterior surface contour (e.g., has substantially the same external size and external shape) and covers substantially the same perimeter as the unmodified conventional fully crystalline zeolite used to make the fully crystalline mesostructured zeolite. Suitable unmodified conventional zeolites may range in size from about 400 nm to about 5 microns. The conditions employed to form the mesopores do not substantially change the external size, external shape or the perimeter of the unmodified zeolite. The density of the fully crystalline mesostructured zeolite is less than the density of the unmodified zeolite, however, the density difference is due to the zeolite removed when the mesopores were formed. In addition, where the fully crystalline mesostructured zeolite is produced from a fully crystalline conventional unmodified zeolite, the fully crystalline mesostructured zeolite maintains the full crystallinity of the unmodified conventional zeolite.

Where the unmodified conventional zeolite has a chemical composition in its framework, after mesopores are formed in the conventional zeolite, the chemical composition in the resulting fully crystalline mesostructured zeolite framework will remain substantially the same as the chemical composition in the unmodified conventional zeolite framework that was used as source material. The chemical composition of the unmodified conventional zeolite can vary from the external surface (e.g., about the zeolite perimeter) to the inner core. However, the chemical composition of unmodified conventional zeolite framework, whether consistent or variable from the perimeter to the inner core of the zeolite, is unchanged when the mesopores are formed in the zeolite. Thus, forming mesopores to create the fully crystalline mesostructured zeolite does not chemically alter the framework of the conventional zeolite. The zeolite stoichiometry is unchanged from the unmodified conventional fully crystalline zeolite to the fully crystalline mesostructured zeolite.

Previous attempts by others to form mesostructures in zeolites has resulted in a change in the chemical composition of the framework of the unmodified conventional zeolite. For example, in zeolites containing Si and Al, prior methods treat the zeolite with a base selected to remove more Al than Si from the zeolite. Where such dealumination methods are employed, at least a portion of the chemical composition in the framework of the zeolite changes, specifically, the tetracoordinated alumina ratio changes. Where the methods of the invention are employed with a zeolite containing Si and Al, in a mesostructured zeolite of the invention the alumina within the mesostructured zeolite framework remains tetracoordinated.

Figure 10:
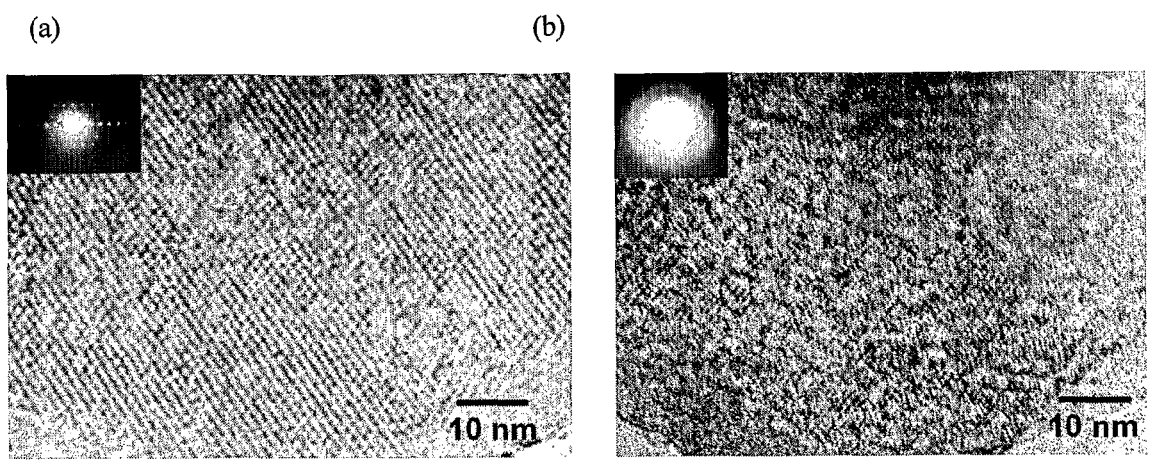
FIG. 10 depicts images obtained by transmission electron microscopy (TEM) of a) detail of a H—Y[MCM-41] fully crystalline mesostructured zeolite, and b) detail of a H—Y [MCM-41] fully crystalline mesostructured zeolite at different focus. The electron diffraction patterns are included as insets.
Figure 11:
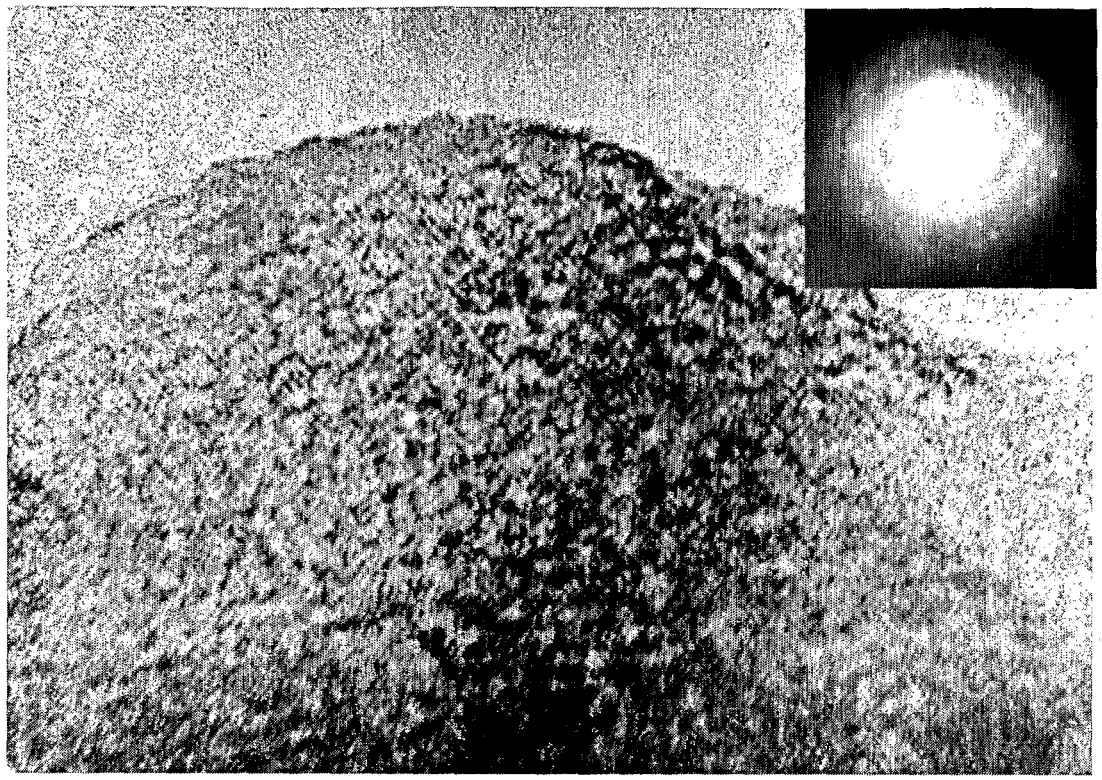
FIG. 11 depict a TEM image of a fully crystalline mesostructured zeolite of the present invention.
Figure 12:
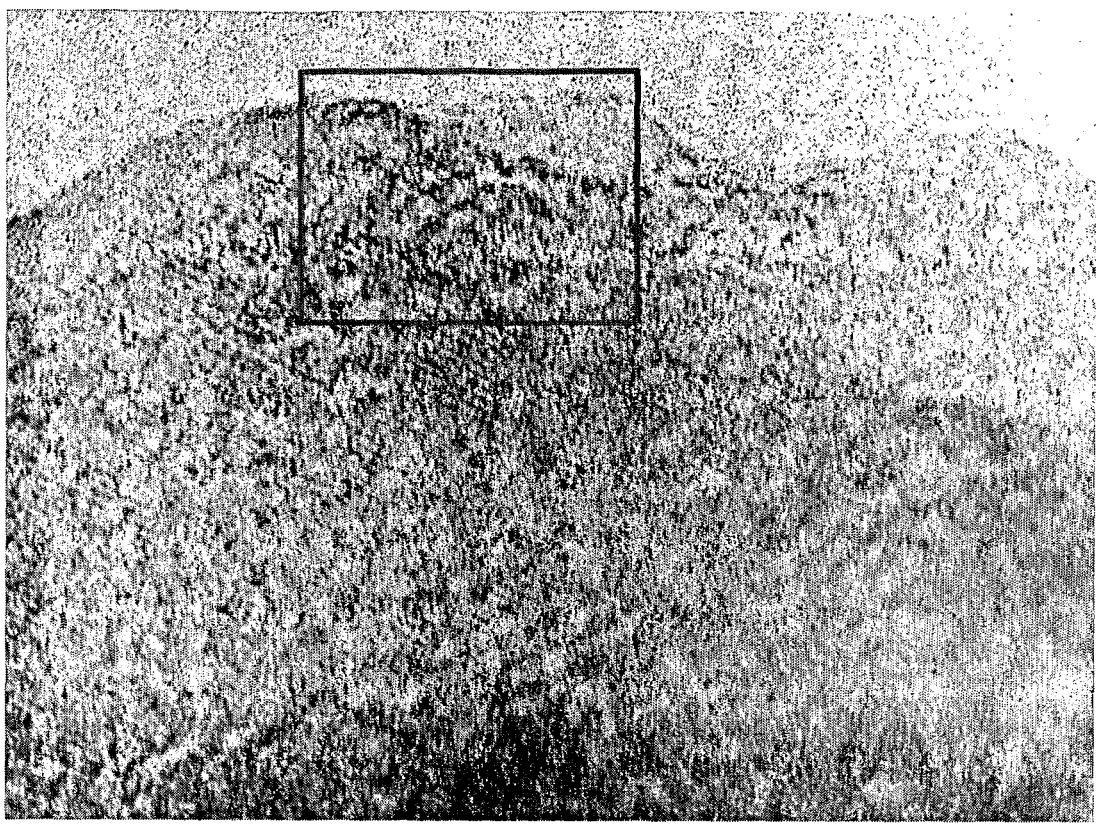
FIG. 12 depicts a TEM image of a fully crystalline mesostructured zeolite of the present invention.

Direct evidence for the hybrid single-phase nature of mesostructured zeolites was obtained via transmission electronic microscopy (TEM). FIGS. 10a and 10b show two details of the H—Y [MCM-41] mesostructured zeolite microstructure at different foci in which both the crystallinity and ordered mesoporosity can be observed in a single phase. Additional TEM images of mesostructured zeolites are depicted in FIGS. 11-12.

Additional evidence of the hybrid nature of mesostructured zeolites comes from catalysis. The presence of mesopores, high surface area, and the thickness of the pore wall or the interior wall between adjacent mesopores is (~2 nm). This must allow access to bulkier molecules and reduce intracrystalline diffusion resistance in the fully crystalline mesostructured zeolites of the invention as compared to conventional unmodified zeolites. So, enhanced catalytic activity for bulky molecules must be observed in mesostructured zeolites compared to zeolites.

For example, semicrystalline mesoporous materials, such as nanocrystalline aluminosilicates PNAs and Al-MSU-$S_{(MFI)}$, shows significantly lower activity for cumene cracking (which is usually correlated to strong Bronsted acidity) than conventional H-ZSM-5. Mesostructured zeolites, however, show even greater activity than zeolites, most likely due to their fully zeolitic structure and the presence of mesopores. For example, H-ZSM-5-[MCM-41] converts 98% of cumene at 300° C. whereas commercial H-ZSM-5 converts 95% in similar conditions.

The anchoring of chemical species on mesostructured zeolites was confirmed by Infrared Spectroscopy (FTIR). The pure chemical species to be anchored, the mesostructured zeolites, and the species modified mesostructured zeolites prepared according the method described herein were all analyzed by FTIR. The species modified mesostructured zeolites exhibited the FTIR bands of the chemical species which did not disappear after washing the samples.

Some of the chemical species anchored on mesostructured zeolites were used as ligands for a homogeneous catalysts. This anchoring of a homogeneous catalyst was confirmed by Infrared Spectroscopy (FTIR), and by catalytic testing of both the homogeneous catalysts and the homogeneous catalysts anchored on the mesostructured zeolite. These experiments were repeated after washing the samples and no major changes were observed, indicating that this method is suitable for anchoring both chemical species and homogeneous catalysts.

Applications

The unique structure of mesostructured zeolites will be useful to a variety of fields, and should address certain limitations associated with conventional zeolites. As catalysis is the most important field of application for zeolites, special emphasis is placed on the catalytic applications of mesostructured zeolites. van Bekkum, H., Flanigen, E. M., Jacobs, P. A., Jansen, J. C. (editors). Introduction to Zeolite Science and Practice, 2nd edition. Studies in Surface Science and Catalysis, 2001, Vol. 137; Corma, A., *Chem. Rev.* 1997, 97, 2373-2419; Davis, M. E., *Nature* 2002, 417, 813-821.

The combination of a mesostructure, a high surface-area, and controlled pore or interior thickness (~2 nm) as measured between adjacent mesopores should provide for access to bulky molecules and reduce the intracrystalline diffusion barriers. Thus, enhanced catalytic activity for bulky molecules should be observed over mesostructured zeolites, as compared to conventional zeolites. See FIGS. 13-14. FIGS. 13-20 include reactions with 1,3,5-triisopropylbenzene being catalytically cracked to form 1,3-diisopropyl benzene. The 1,3,5-triisopropylbenzene is representative of molecules present in crude oil and 1,3-diisopropyl benzene is representative of a product within the gasoline range. These experiments are a surrogate for molecules present in crude oil that are cracked to form gasoline.

Figure 13:
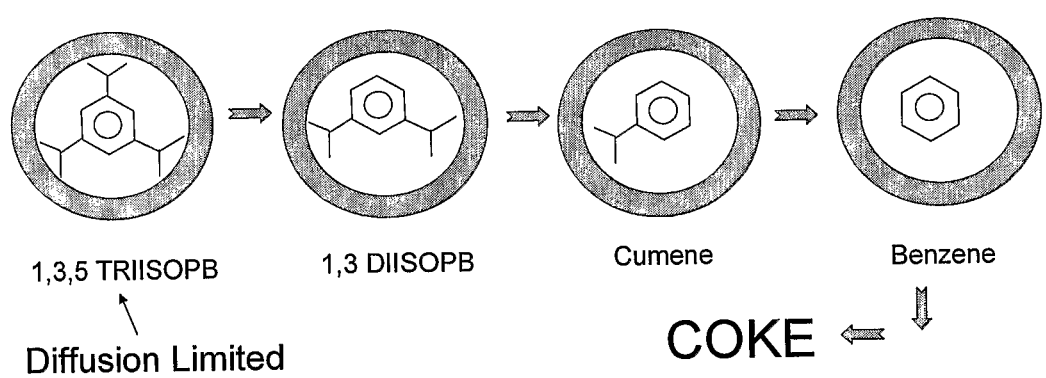
FIG. 13 depicts a schematic illustration of catalytic cracking of 1,3,5-triisopropyl benzene by the unmodified conventional zeolite H—Y.
Figure 14:
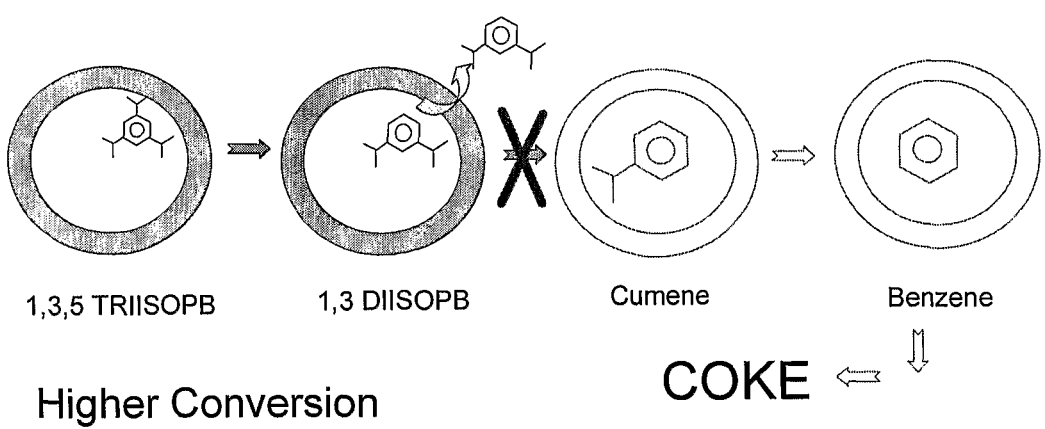
FIG. 14 depicts a schematic illustration of catalytic cracking of 1,3,5-triisopropyl benzene a fully crystalline mesostructured zeolite of the present invention.

FIG. 13 depicts the process of catalytic cracking of 1,3,5-triisopropyl benzene by zeolite H—Y. Catalytic cracking is selectivity and/or efficiency limited, because diffusion is limited by the small pore size of the zeolite H—Y. Because the conventional unconverted zeolite crystal has limited diffusion, it is difficult for the reaction product, e.g., 1,3-diisopropyl benzene, to exit the zeolite. As a result, over cracking occurs and light compounds are formed resulting in excess formation of undesirable products cumene, benzene, and coke. FIG. 14 depicts the process of catalytic cracking of 1,3,5-triisopropyl benzene by a mesostructured zeolite of the present invention. In contrast to catalytic cracking with the unmodified conventional zeolite H—Y, the larger pore size, the controlled mesopore volume, and the controlled interior or pore wall thickness present in the fully crystalline mesostructured zeolite, facilitates the exit of desired products, e.g., 1,3-diisopropyl benzene, from the mesostructure and over cracking that produces cumene, benzene and coke are avoided. As a result, there is a higher catalytic cracking conversion of the desired product, 1,3-diisopropyl benzene.

Figure 15:
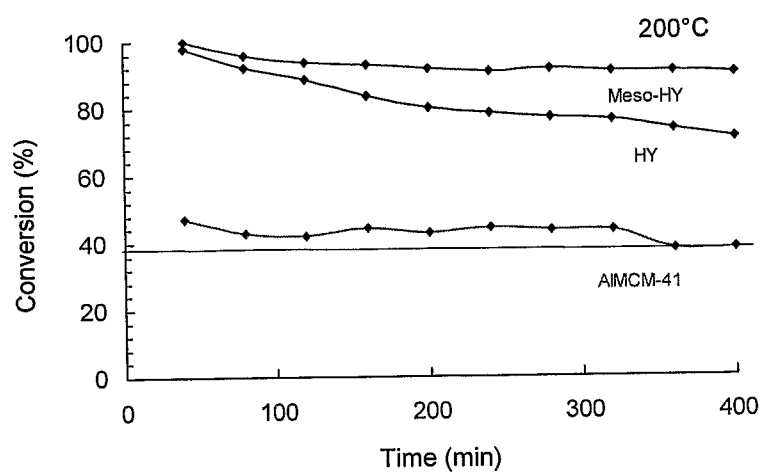
FIG. 15 depicts catalytic activity for 1,3,5-triisopropyl benzene cracking shown as conversion vs. time for the fully crystalline mesostructured zeolite H—Y[MCM-41], labeled Meso-HY, its unmodified zeolitic version H—Y, and a conventional Al-MCM-41. A 50 mL/min of He flow saturated with 1,3,5-triisopropylbenzene at 120° C. was flowed at 200° C. over 50 mg of catalyst.
Figure 17:
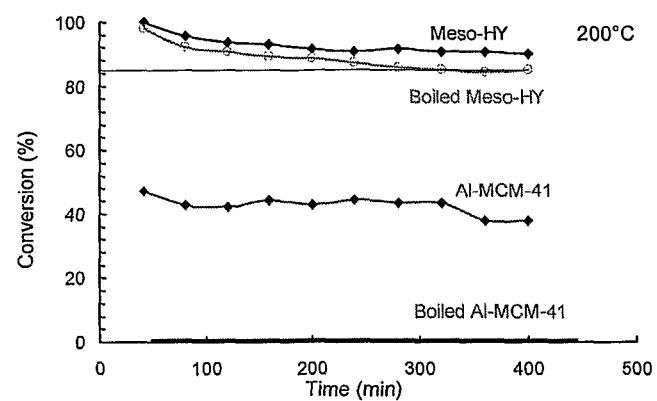
FIG. 17 depicts the hydrothermal stability of the fully crystalline mesostructured zeolite H—Y, H—Y[MCM-41], labeled Meso-H—Y, compared to the conventional non-mesolytic zeolite Al-MCM-41.

Acid catalysts with well-defined ultralarge pores are highly desirable for many applications, especially for catalytic cracking of the gas oil fraction of petroleum, whereby slight improvements in catalytic activity or selectivity would translate to significant economic benefits. Venuto, P. B., Habib, E. T., Jr. Fluid Catalytic Cracking with Zeolite Catalysts. Marcel Dekker, New York, 1979; Harding, R. H., et al., *Appl. Catal. A: Gen.,* 2001, 221, 389-396; Degnan, T. F., et al., *Microporous Mesoporous Mater.,* 2000, 35-36, 245-252. As a test reaction, we have examined the catalytic cracking of 1,3,5-triisopropylbenzene (critical dimension 0.95 nm) to produce 1,3-diisopropyl benzene. FIG. 15 depicts catalytic activity for 1,3,5-triisopropyl benzene cracking shown as percent conversion to 1,3-diisopropyl benzene vs. time for the mesostructured zeolite H—Y[MCM-41], which is labelled Meso-H—Y, the zeolite H—Y, and a conventional Al-MCM-41. Catalytic cracking was performed when 50 mL/min of He saturated with 1,3,5-triisopropylbenzene at 120° C. was flowed at 200° C. over 50 mg of each catalyst. The H—Y [MCM-41] mesostructured zeolite demonstrated superior catalytic activity for this cracking reaction after 400 min at 200° C. (93% conversion) compared to the H—Y zeolite (71% conversion) and the mesoporous Al-MCM-41 (39% conversion) (see FIG. 15). This result was attributed to its combination of strong acidity and mesostructured nature. The mesopores and the mesostructure surrounding the mesopores greatly facilitated the hydrocarbon diffusion within the H—Y [MCM-41] catalyst thereby improving conversion. The H—Y[MCM-41] mesostructured zeolite is stable and maintains mesostructure integrity even under harsh conditions. FIG. 17 depicts the hydrothermal stability of H—Y[MCM-41], labelled Meso-H—Y compared to the non-mesolytic zeolite Al-MCM-41. For example, the boiled mesostructured zeolite H—Y[MCM-41], labelled Meso-H—Y, also maintained its physicochemical integrity even after being boiled for several days, exhibiting a high 1,3,5-triisopropylbenzene activity (87% conversion to 1,3-diisopropyl benzene after 400 min) even after such severe treatment. The term boiled is used for convenience, however, the specific treatment to the material includes suspending the solid in water and heating the water and solid material under reflux conditions. See FIG. 17. This outcome illustrated the superior hydrothermal stability of H—Y[MCM-41] over the amorphous Al-MCM-41 catalyst, which lost its activity and ordered mesostructure after exposure to similar conditions. These results show that hydrothermally stable H—Y[MCM-41] is a crystalline material and its crystallinity contrasts the amorphous Al-MCM-41 catalyst that structurally collapsed after boiling, rendering it unable to convert appreciable quantities via catalytic cracking.

Figure 19:
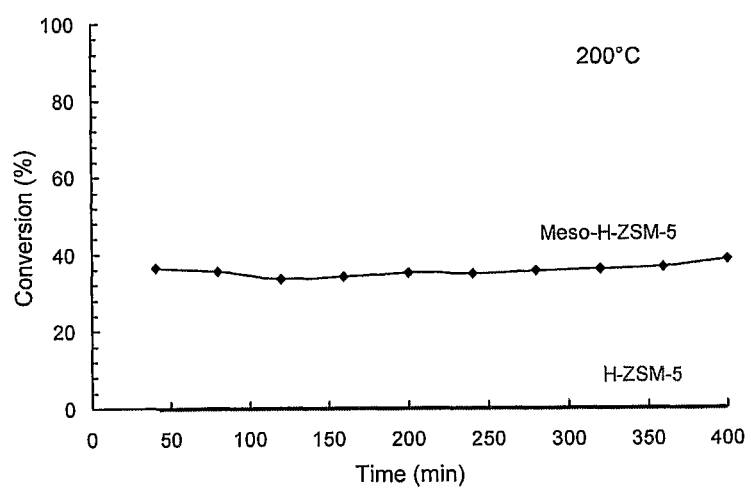
FIG. 19 depicts catalytic activity for 1,3,5-triisopropyl benzene cracking shown as conversion vs. time for the fully crystalline mesostructured zeolite H-ZSM-5-[MCM-41], labeled Meso-H-ZSM-5, and its unmodified zeolitic version H-ZSM-5. A 50 mL/min of He flow saturated with 1,3,5- triisopropylbenzene at 120° C. was flowed at 200° C. over 50 mg of each catalyst, H-ZSM-5-[MCM-41] and H-ZSM-5.

FIG. 19 depicts catalytic activity for 1,3,5-triisopropyl benzene cracking shown as percent conversion vs. time for H-ZSM-5-[MCM-41], labeled Meso-H-ZSM-5, and its zeolitic version, H-ZSM-5. A 50 mL/min of He flow saturated with 1,3,5-triisopropylbenzene at 120° C. was flowed at 200° C. over 50 mg of each catalyst, H-ZSM-5-[MCM-41] and H-ZSM-5. H-ZSM-5 is used as an important additive in cracking catalysts to increase propylene production and improve octane number in gasoline. Degnan, T. F., et al., *Microporous Mesoporous Mater.,* 2000, 35-36, 245-252. However, due to its small pores, H-ZSM-5 is inactive in 1,3,5-triisopropylbenzene cracking at 200° C. (<1% conversion to 1,3-diisopropyl benzene after 400 min). The incorporation of MCM-41 mesostructure in this zeolite (H-ZSM-5-[MCM-41]) successfully achieved substantial activity, with 40% conversion of 1,3,5-triisopropylbenzene to 1,3-diisopropyl benzene after 400 min (see FIG. 19). In this case, the activity was attributed to the mesopores and strong acidity of the mesostructured zeolite.

More than 135 different zeolitic structures have been reported to date, but only about a dozen of them have commercial applications, mostly the zeolites with 3-D pore structures. Conna, A., *Chem. Rev.,* 1997, 97, 2373-2419; Davis, M.

Figure 18:
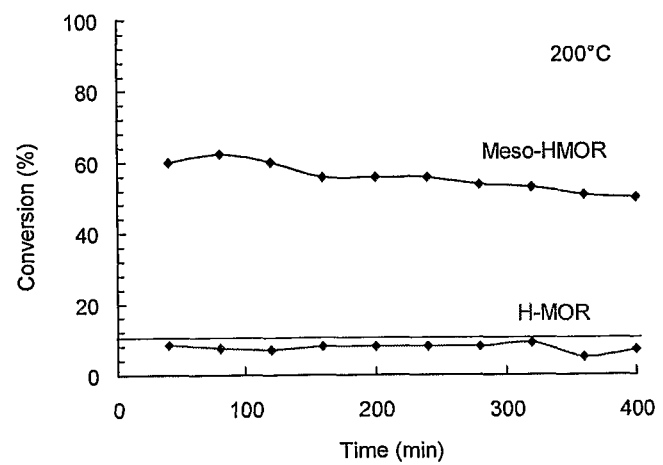
FIG. 18 depicts catalytic activity for 1,3,5-triisopropyl benzene cracking shown as conversion vs. time for the fully crystalline mesostructured zeolite H-MOR[MCM-48], labeled Meso-HMOR, and its unmodified zeolitic version H-MOR. A 50 mL/min of He flow saturated with 1,3,5-triisopropylbenzene at 120° C. was flowed at 200° C. over 50 mg of each catalyst, H-MOR[MCM-48] and H-MOR.

E., *Nature*, 2002, 417, 813-821. The incorporation of 3-D mesopores would be especially beneficial for zeolites with 1-D and 2-D pore structures as it would greatly facilitate intracrystalline diffusion. Zeolites with 1-D and 2-D pore structures are not widely used, because the pore structure is less then optimal. To illustrate the potential of mesostructure processing of zeolites with low pore interconnectivity, H-MOR with 1-D pores were prepared with a MCM-48 mesostructure by exposing the H-MOR zeolite with 1-D pores to a pH controlled solution in the presence of a surfactant under suitable time and temperature conditions, described above. The resulting H-MOR[MCM-48] with 3-D mesostructured structures was examined for the catalytic cracking of 1,3,5-triisopropylbenzene at 200° C. FIG. 18 depicts catalytic activity for 1,3,5-triisopropyl benzene cracking shown as conversion to 1,3-diisopropyl benzene vs. time for H-MOR[MCM-48] labeled Meso-HMOR, and its zeolitic version, H-MOR. A 50 mL/min of He flow saturated with 1,3,5-triisopropylbenzene at 120° C. was flowed at 200° C. over 50 mg of each catalyst, H-MOR[MCM-48] and H-MOR. Catalytic cracking with H-MOR[MCM-48] exhibited 50% conversion after 400 min, which was significantly higher compared to the 7% conversion achieved by H-MOR (see FIG. 18). Zeolites with 1-D pore structures show a more dramatic improvement when exposed to the mesostructure process as compared to the zeolites with 2-D pore structures, but this is to be expected, because the 1-D pore structure zeolites begin with a more limited diffusion. When exposed to the mesostructure process, zeolites with 2-D pore structures result in 3-D mesostructures. Exposing 1-D and 2-D pore structure zeolites to the instant process for forming mesostructures in fully crystalline inorganic material, e.g., zeolites, may increase the usefulness of these otherwise underused zeolites.

Figure 16:
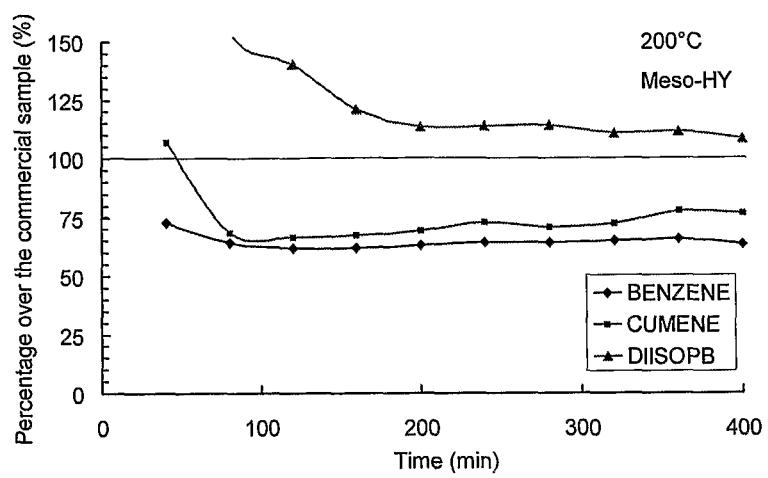
FIG. 16 depicts the catalytic cracking of 1,3,5-triisopropyl benzene with the fully crystalline mesostructured zeolite H—Y[MCM-41], labeled Meso-H—Y, to diisopropyl benzene and cumene. The H—Y[MCM-41] results are compared to the normalized results from a commercial sample of unmodified fully crystalline zeolite H—Y. Catalytic cracking with the fully crystalline mesostructured zeolite H—Y [MCM-41] results in higher selectivity and reduction in benzene production.

Mesostructured zeolites not only showed much higher catalytic activity, but also enhanced selectivity over zeolites. Referring now to FIG. 16, a commercially available zeolite H—Y was employed to catalytically crack 1,3,5-triisopropylbenzene. The resulting products were 1,3-diisopropyl benzene, benzene, and cumene and the fractional composition results were normalized to be 100%. The mesostructured zeolite labelled Meso-HY, which is H—Y[MCM-41], was employed to catalytically crack 1,3,5-triisopropylbenzene under identical conditions employed with H—Y. Increased production of 1,3-diisopropyl benzene (about 110% of the 1,3-diisopropyl benzene produced with the zeolite H—Y) and decreased production of benzene and cumene (about 75% of the benzene and cumene produced with the zeolite H—Y) was observed. In this example, H—Y[MCM-41] mesostructured zeolite produced only 75% of the benzene generated by the H—Y zeolite. See FIG. 16. Benzene is a toxic compound whose presence in gasoline is being increasingly restricted by legislation. Degnan, T. F., et al., *Microporous Mesoporous Mater.*, 2000, 35-36, 245-252. The benzene production was even lower in the case of H-MOR[MCM-48], and was minimal in the case of H-ZSM-5-[MCM-41]. The decrease in benzene production has been observed in small zeolite crystals, and was related to the intrinsic ability of crystals with higher surface areas to limit successive cracking reactions. Al-Khattaf, S., et al., *Appl. Catal. A: Gen.* 2002, 226, 139-153. It also reduced the formation of coke, which was the undesired end-product of the cracking process that was responsible for catalyst deactivation. Thus, the mesostructured zeolites not only provided for higher catalytic activity and selectivity, but also longer catalyst life time.

Zeolitic nanorods (ZNRs), another form of mesostructured zeolite, also enhance catalytic activity by increasing active-site accessibility. The rod-shape ZNRs are only nanometer-sized in diameter, so internal diffusional resistance is minimal. These new mesostructured zeolites (also referred to as nanostructures) were tested as cracking catalysts for the gas oil fraction of petroleum to assess their potential. FIG. 20A depicts, on the left hand side Y axis, the percent conversion of 1,3,5-triisopropylbenzene to 1,3-diisopropyl benzene versus time for H-MOR[ZNR] and H-MOR. The ratio of benzene produced by H-MOR/benzene produced by H-MOR[ZNR] as a function of time is also shown on the secondary Y axis located on the right hand side of FIG. 20A and an arrow is present on the line that connects this data. A helium flow of 50 mL/min saturated with 1,3,5-triisopropylbenzene at 120° C. was introduced over 50 mg of each catalyst, H-MOR[ZNR] and H-MOR, at 200° C.

In the cracking of 1,3,5-triisopropylbenzene, the conventional H-MOR zeolite showed a low activity (7% conversion to 1,3-diisopropyl benzene after 400 min) due to its medium-sized (0.65×0.70 nm), 1-D pores. In contrast, H-MOR[ZNR] achieved a much higher catalytic activity under similar conditions (~52% conversion to 1,3-diisopropyl benzene) (see FIG. 20A). This significant increase in catalytic activity was attributed to ZNRs' higher surface areas, readily accessible active sites, and improved intracrystalline diffusivity.

Besides increased activity, ZNRs also showed improved selectivity due to their nanostructured rod-shape morphology. For example, H-MOR[ZNR] produced 3 times less benzene per mole of 1,3,5-triisopropylbenzene converted as compared to the commercial zeolite H-MOR (see the secondary Y axis on the right hand side of FIG. 20A). Benzene may include, for example, benzene derivatives such as, for example, toluene, xylene, and other related derivative compounds. This significant increase in selectivity also helped to reduce coke formation, which has been a major problem with conventional cracking catalysts, especially those containing 1-D pores, such as mordenite.

The simple, inexpensive and generalized synthesis strategy described here allows for the preparation of ZNR, a crystalline material with walls that are only several nanometers thick (3-20 nm), in which nanorings and junctions are common. The novel synthesis strategy was based on the "programmed" zeolitic transformation of mesoporous materials, which avoided the typical drawbacks of nanoscaled zeolite synthesis (e.g., low yield, difficulty in separation, and high pressure drops), and did not require the use of a layered precursor. The unique crystalline structure of ZNRs provided for improved catalytic conversion of bulky molecules by increasing the accessibility to its microporosity, while reducing interparticle and intraparticle diffusion barriers.

Referring now to FIGS. 20B and 20C, mesostructured zeolites were tested for crude oil refining via Microactivity Test (ASTM D-3907). This is a well known and widely accepted technique to estimate the performance of FCC (Fluid Catalytic Cracking) catalysts. Vacuum gas-oil was used as feed in a fluid-bed stainless steel reactor. The experiments were conducted under identical conditions with mesostructured zeolites and their conventional zeolites counterparts.

FIG. 20B depicts microactivity test (MAT) results of a conventional fully crystalline zeolite H—Y (Si/Al=15) and its fully crystalline mesostructured version H—Y[MCM-41]. Microactivity test conditions included the reaction temperature of 500° C., the catalyst contact time was 60 seconds, the catalyst charge was 1 grams, the catalyst/vacuum gas oil ration was 2, the WHSV was 30 g/h/g. The conversion, specifically, how much of the vacuum gas oil feed was converted into product, with all yield normalized to 100% for comparison purposes, was for the unmodified fully crystalline zeolite H—Y: 61.22% and for the fully crystalline mesostructured zeolite, H—Y[MCM-41]: 67.20%. Although not depicted in FIG. 20B, the results of this test provide an LPG fraction of H—Y of 17.45% and LPG fraction of H—Y[MCM-41] of 15.27%.

FIG. 20C depicts the composition of the LPG fraction obtained by Microactivity test (MAT) of a conventional fully crystalline zeolite H—Y (Si/Al=15) and its fully crystalline mesostructured version H—Y[MCM-41], described above in conjunction with FIG. 20B. The composition of the LPG fraction was analyzed to determine the components of the LPG fraction. Where the fully crystalline zeolite H—Y was used the LPG fraction was 17.45%. Where the fully crystalline mesostructured zeolite HY[MCM-41] was used the LPG fraction was 15.27%. In addition, the fully crystalline mesostructured zeolites produced more olefins, which are desired products. Referring now to the X-axis on FIG. 20C the label C3 indicates propane, the label C3=indicates propene, the label i-C4 indicates isobutane, the label n-C4 indicates normal butane, the label i-C4=indicates isobutene, and the label n-C4=indicates normal butene. Specifically, the fully crystalline mesostructured zeolite produced increased propene, isobutene, and normal butene in the LPG fraction then the unmodified fully crystalline zeolite. Further, the fully crystalline mesostructured zeolite produced a lesser fraction of LPG than with its counter part conventional unmodified fully crystalline zeolite. The internal wall thickness of the fully crystalline mesostructured zeolite is less than the internal wall thickness of the unmodified fully crystalline zeolite. Thus the thinner internal walls in the fully crystalline mesostructured zeolites reduce hydrogen transfer reactions, which are responsible for the undesired conversion of olefins to paraffins. Accordingly, an increased number of desired olefins are produced where fully crystalline mesostructured zeolites are used instead of conventional unmodified fully crystalline zeolites.

In the MET, generally, the samples were displayed in a fluidized-bed stainless steel reactor. Reaction temperature was 500° C., the amount of catalyst was 3.0 g, the catalyst/oil ratio was 2.0, the WHSV was 30 g/h/g, and the contact time was 60 seconds. These tests showed that using H—Y[MCM-41] in place of conventional H—Y resulted in a 43% increase in gasoline production, a 75% increase in propylene and a 110% increase in butenes. Additionally, there is a 32% decrease in coke formation, a 23% decrease in Total Dry Gas, and a 12% decrease in LPG (Liquified Petroleum Gases). The presence of mesopores in the H—Y[MCM-41], which has at least double the surface area of H—Y, favours the cracking of the larger molecules present in the crude oil, which cannot be transformed within the micropores of conventional zeolites. Typically, conventional zeolites have pores measuring about 0.7 nm, which are too small to efficiently process desirable products, for example, alkyl benzene, contained in heavy crude oil fractions. Larger pore sizes are required to facilitate improved surface area contact (including within the pore walls or mesopore surfaces) with the hydrocarbon materials. For comparison, the diameter of each of the mesopores, which are surrounded by the mesopore surfaces of the fully crystalline mesostructure of the invention, can measure, e.g., about 2 nm. The increased production of light olefins was related to the reduction of hydrogen transfer reaction due to the presence of favorable interior or pore wall thickness in the fully crystalline mesostructured zeolites (~2 nm) as opposed to the thick crystals of conventional zeolites (~1000 nm). This interior or pore wall thickness also results in reduction of overcracking, significantly reduces coke formation, and reduces production of Total Dry Gas and LPG.

Pyrolysis of plastics has gained renewed attention due to the possibility of converting these abundant waste products into valuable chemicals while also producing energy. Williams, P. T. Waste Treatment and Disposal; John Wiley and Sons, Chichester, UK, 1998. Acidic catalysts, such as zeolites, have been shown to be able to reduce significantly the decomposition temperature of plastics and to control the range of products generated. Williams, P. T. Waste Treatment and Disposal. John Wiley and Sons, Chichester, UK, 1998; Park, D. W., et al., *Polym. Degrad. Stability* 1999, 65, 193-198; Bagri, R., et al., *J. Anal. Pyrolysis,* 2002, 63, 2941. However, the accessibility of the bulky molecules produced during plastic degradation has been severely limited by the micropores of zeolites.

The catalytic degradation of polyethylene (PE) by commercially available zeolites and their corresponding mesostructured zeolites was studied by thermal gravimetric analysis (TGA). FIG. 21 depicts the percentage of polyethylene (PE) weight lost vs. temperature for the following mixtures of catalysts in weight ratio to PE. The curves labeled (A)-(G) depicts results of the following degradation curves: (A): no catalyst, (B): H-ZSM-5:PE 1:2, (C): H-ZSM-5-[MCM-41]:PE 1:2, (D): H-ZSM-5:PE 1:1, (E) H-ZSM-5:PE 2:1, (F): H-ZSM-5-[MCM-41]:PE 1:1, and (G) H-ZSM-5-[MCM-41]:PE 2:1. In all cases, fully crystalline mesostructured zeolites allow for reduced decomposition temperatures compared to the unmodified commercial zeolites (by 35° C. in the case of (C)H-ZSM-5-[MCM-41] vs. (B) H-ZSM-5), even at high catalyst:PE ratios (see FIG. 21). In fact, referring to the curve labelled (F), with a H-ZSM-5-[MCM-41]:PE weight ratio of 1:1, a lower decomposition temperature was achieved compared to that required by, referring to curve labeled (E), a ZSM-5:PE weight ratio of 2:1.

The large accessible surface area and ion-exchange properties of fully crystalline mesostructured zeolites will also facilitate the surface functionalization, the immobilization of homogeneous catalysts, and the deposition of metal clusters. Thus, fully crystalline mesostructured zeolites also serve as a very useful catalyst support for a variety of reactions.

With their improved accessibility and diffusivity compared to conventional zeolites, fully crystalline mesostructured zeolites may also be employed in place of unmodified conventional zeolites in other applications, such as gas and liquid-phase adsorption, separation, catalysis, catalytic cracking, catalytic hydrocracking, catalytic isomerization, catalytic hydrogenation, catalytic hydroformilation, catalytic alkylation, catalytic acylation, ion-exchange, water treatment, pollution remediation, etc. Many of these applications suffer currently from limitations associated with the small pores of zeolites, especially when bulky molecules are involved. van Bekkum, H., Flanigen, E. M., Jacobs, P. A., Jansen, J. C. (editors), Introduction to Zeolite Science and Practice, 2nd edition. Studies in Surface Science and Catalysis, Vol. 137, 2001; Corma, A., *Chem. Rev.,* 1997, 97, 2373-2419; Davis, M. E., *Nature,* 2002, 417, 813-821. Mesostructured zeolites present attractive benefits over zeolites in such applications.

Organic dye and pollutant removal from water is of major environmental importance, and represents the third major use of zeolites (accounting for 80 tons of zeolites per year). Galo, J. de A. A., et al., *Chem. Rev.* 2002, 102, 4093-4138. However, most of the organic dyes are bulky, which make their removal slow or incomplete, requiring a huge excess of zeolites in the process. Fully crystalline mesostructured zeolites offer significant advantage over unmodified conventional zeolites in organic dye and pollutant removal with their larger surface area and pore size.

Kits

This invention also provides kits for conveniently and effectively implementing the methods of this invention. Such kits comprise any of the zeolitic structures of the present invention or a combination thereof, and a means for facilitating their use consistent with methods of this invention. Such kits provide a convenient and effective means for assuring that the methods are practiced in an effective manner. The compliance means of such kits includes any means which facilitates practicing a method of this invention. Such compliance means include instructions, packaging, and dispensing means, and combinations thereof. Kit components may be packaged for either manual or partially or wholly automated practice of the foregoing methods. In other embodiments involving kits, this invention contemplates a kit including block copolymers of the present invention, and optionally instructions for their use.

EXEMPLIFICATION

The invention now being generally described, it will be more readily understood by reference to the following examples, which are included merely for purposes of illustration of certain aspects and embodiments of the present invention, and are not intended to limit the invention.

Example 1

Synthesis of H—Y[MCM-41]

0.79 g of zeolite H—Y (Zeolyst CBV-720 Si/Al=15) were stirred in 50 mL of a 0.37 M $NH_4OH$ solution containing 0.55 g of CTAB, for 20 minutes, after which time the synthesis mixture was hydrothermally treated at 150° C. for 10 hours. The solid was filtered, washed, and finally ramped in nitrogen at 5° C./min until 550° C., and then switched to air for 4 hours. Similar conditions were used to calcine all of the samples. Alternatively, 1 g of H—Y (Zeolyst CBV-720 Si/Al=15) was stirred for in 30 mL of a 0.09 M tetramethylammonium hydroxide (TMA-OH) solution. Then 0.5 g of cetyltrimethylammonium bromide (CTAB) was added. After 30 minutes of stirring the suspension was hydrothermally treated for 20 hours at 150° C. Structural parameters are presented in Table 1.

Example 2

Synthesis of H-MOR[MCM-41]

2.0 g of zeolite H-MOR (calcined Zeolyst CBV21A Si/Al=10) was stirred in 50 mL of 0.27 M TMA-OH solution. Afterwards, 1.0 g of CTAB was added. After other 30 minutes of stirring the synthesis solution was hydrothermally treated at 150° C. for 20 hours. Structural parameters are presented in Table 1.

Example 3

Synthesis of H-ZSM-5-[MCM-41]

1.0 g of $NH_4$-ZSM-5 (Zeolyst CBV3024E Si/Al=15) was stirred in 50 mL of 0.8 M HF solution for 4 hours. This suspension was added to a solution containing 0.69 g of CTAB, and stirred for 30 minutes. The resulting synthesis mixture was basified by slowly adding 2.5 g of a 30% $NH_4OH$ solution. Finally, it was hydrothermally treated at 150° C. for 20 hours. Structural parameters are presented in Table 1. The wall thickness was determined by the standard method within the art by subtracting the distance between two pore centers ($a_o$, obtained via X-ray diffraction) and the pore size (determined by $N_2$ adsorption).

TABLE 1

Structural parameters for the mesostructured zeolites.

| | $a_o$ (nm) | Pore diameter (nm) | Wall thickness (nm) |
|---|---|---|---|
| H-Y[MCM-41] | 4.2 | 2.6 | 1.6 |
| H-MOR[MCM-41] | 4.7 | 2.5 | 2.2 |
| H-ZSM-5[MCM-41] | 4.8 | 2.6 | 2.2 |

Example 4

Catalytic cracking of Cumene and 1,3,5-triisopropylbenzene

Catalytic tests were carried out in a lab-scale packed-bed catalytic reactor connected to a gas chromatograph (Hewlett Packard HP6890 Series) with a DB petrol (50 m×0.2 mm×0.5 microns) column. In all cases, 50 mL/min of He were flowed through 50 mg of catalyst. For cumene cracking the gas flow was saturated with cumene at room temperature and the reaction temperature was 300° C. For 1,3,5-triisopropylbenzene cracking the gas flow was saturated at 120° C. and the reaction temperatures were 300° C.

Example 5

Polyethylene (PE) degradation

An initial mass of ~10 mg of catalyst:PE samples with ratios 1:2, 1:1, and 2:1 were ramped in a thermogravimetric analyzer (Perkin Elmer TGA7) at 10° C./min in a 250 mL/min flow of He until 600° C. Results are depicted in FIG. 21.

Example 6

Chemical species and homogeneous anchoring on mesostructured zeolites

The acid form of the fully crystalline mesostructured zeolite with faujasite structure and MCM-41, architecture, H—Y[MCM-41], (Si/Al~15), was ion exchanged in a 0.1 M $NH_4OH$ solution for 24 h in order to produce $NH_4$—Y[MCM-41]. The resulting material was ion-exchanged again in a 7.0 mM $NH_2(CH_2)_2NMe_3Cl$ solution for 24 h. After filtering and washing thoroughly, the sample was dried at 60° C. overnight. Finally, this amine functionalized mesostructured zeolite was added to a 2.0 mM $Rh(PPh_3)_3$ solution (Wilkinson catalyst) for 24 h. After filtering and washing thoroughly, the sample was dried at 60° C. overnight. All the products, as well as the quartenary amine and the Wilkinson catalyst, were analyzed by FTIR to confirm the presence of the different species on the mesostructured zeolite even after thorough washing (see FIG. 22). FIG. 22 depicts the FTIR spectra of a) H—Y[MCM-41], b) $NH_4$—Y[MCM-41], c) $NH_2(CH_2)_2NMe_3Cl$, d) $NH_2(CH_2)_2NMe_3$-Y[MCM-41], d) $Rh(PPh_3)_3Cl$, and e) $Rh(PPh_3)_3NH_2(CH_2)_2NMe_3$-Y[MCM-41].

Example 7

Synthesis of Zeolitic NanoRods (ZNRs)

In a synthesis of nanostructured zeolites, 0.36 g of NaOH are dissolved in 30 ml of water to produce a basic solution with a pH measuring 13.5. Thereafter 1 g of H—Y (Zeolyst CBV 720) with an original Si/Al ratio of ~15 is added to the basic solution. After a 12 hours of stirring at room temperature, the zeolite and base mixture had a pH measuring 11.5. Thereafter, 0.5 g of CTAB (cetyl-trimethyl ammonium bromide) was added to the zeolite and base mixture to produce a cloudy suspension. The cloudy suspension was transferred into teflon-lined stainless steel autoclaves and treated hydrothermally at 150° C. under autogeneous pressure. The samples were collected at different times, washed, dried and analyzed by X-ray Difraction, IR Spectroscopy, TEM, $N_2$ adsorption at 77K, TGA and Elemental Analysis. In a similar synthesis procedure H-ZSM-5[ZNR] was produced using H—Y (Zeolyst Si/Al~80).

INCORPORATION BY REFERENCE

All of the patents and publications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. A method of making a one-phase mesostructured crystalline zeolite material having long-range crystallinity and comprising a plurality of mesopores, the method comprising:
   a) providing an initial zeolite material having long range crystallinity;
   b) exposing at least a portion of said initial zeolite material to a pH controlling substance and a surfactant in a first reaction mixture under conditions sufficient to increase the mesoporosity of said initial zeolite material; and
   c) recovering a one-phase mesostructured crystalline zeolite material from said first reaction mixture, wherein said mesostructured crystalline zeolite material comprises a plurality of mesopores defined by and penetrating through at least a portion of the volume of the crystalline zeolite structure, wherein the plurality of mesopores has a controlled cross sectional area, thereby forming a one-phase mesostructure having long-range crystallinity.

2. The method of claim 1, wherein said exposing further comprises i) selecting the pH controlling substance and/or ii) selecting the quantity of the surfactant in order to control at least one of the pore volume, the mesopore diameter, and/or the mesopore cross sectional area of at least a portion of the plurality of mesopores defined within the mesostructured crystalline zeolite material.

3. The method of claim 1 further comprising
   exposing the initial zeolite material to the pH controlling medium under a first set of time and temperature conditions; and
   exposing the initial zeolite material to the surfactant under a second set of time and temperature conditions.

4. The method of claim 3 wherein exposing the initial zeolite material to the pH controlling medium under the first set of time and temperature conditions and exposing the initial zeolite material to the surfactant under the second set of time and temperature conditions occur simultaneously.

5. The method of claim 3 wherein exposing the initial zeolite material to the pH controlling medium under the first set of time and temperature conditions and exposing the initial zeolite material to the surfactant under the second set of time and temperature conditions occur sequentially, under conditions that do not substantially dissolve the inorganic material.

6. The method of claim 5 wherein the initial zeolite material is first exposed to the pH controlling medium under the first set of time and temperature conditions and is then exposed to the surfactant under the second set of time and temperature conditions.

7. The method of claim 1 wherein the conditions produce a mesostructure having substantially the same hydrothermal stability as the initial zeolite material.

8. The method of claim 1 wherein at least a portion of the exposing is carried out under hydrothermal conditions.

9. The method of claim 1 wherein the conditions include a temperature in the range of from about 100° C. to about 200° C.

10. The method of claim 1 wherein the conditions include a temperature in the range of from about room temperature to about 60° C.

11. The method of claim 1 wherein the conditions include a temperature in the range of from about 100° C. to about 150° C.

12. The method of claim 1 wherein the conditions include a temperature in the range of from about 120° C. to about 150° C. and an exposure time in the range of from about 4 hours to about 1 week.

13. The method of claim 1 wherein the conditions include an exposure time in the range of from about 1 hour to about 2 weeks.

14. The method of claim 1 wherein the conditions include an exposure time in the range of from about 12 hours to about 2 weeks.

15. The method of claim 1 wherein the mesostructured crystalline zeolite material comprises at least one mesostructured zeolitic one-phase hybrid single crystal material having long-range crystallinity and comprising a plurality of mesopores.

16. The method of claim 15, wherein the mesostructured crystalline zeolite material exhibits a sharp nitrogen uptake at a partial pressure [$P/P_0$] higher than a partial pressure indicating microporosity.

17. The method of claim 16, wherein the higher partial pressure at which the mesostructured crystalline zeolite material exhibits a of the sharp nitrogen uptake is between about 0.2 and 0.6.

18. The method of claim 17, wherein the higher partial pressure at which the mesostructured crystalline zeolite material exhibits a sharp nitrogen uptake is about 0.3.

19. The method of claim 15, wherein the mesostructured crystalline zeolite material has a faujasite (FAU), mordenite (MOR), or ZSM-5 (MFI) structure.

20. The method of claim 1, wherein the mesopores have a mean pore diameter from about 2 to about 5 nm.

21. The method of claim 1, wherein the mesopores have a wall thickness from about 1 to about 5 nm.

22. The method of claim 1, wherein the plurality of the mesopores have a pore size diameter distribution ranging from about one half to about double the average pore size diameter.

23. The method of claim 1, wherein the mesopores define a mesopore pore volume, wherein at least a portion of the mesopore pore volume has a pore size diameter distribution ranging from about one half to about double the average pore size diameter.

24. The method of claim 1, wherein the initial zeolite material is a faujasite.

25. The method of claim 1, wherein the mesostructured crystalline zeolite material has a mesoporous volume adsorption of at least about 0.05 cc/g.

26. The method of claim 1, wherein the mesostructured crystalline zeolite material has a mesoporous volume adsorption of at least about 0.1 cc/g.

27. The method of claim 1, wherein the mesostructured crystalline zeolite material has a mesoporous volume adsorption of at least about 0.2 cc/g.

28. The method of claim 1, wherein the mesostructured crystalline zeolite material comprises a metal oxide, a zeolite, a zeotype, an aluminophosphate, a gallophosphate, a zincophosphate, a titanophosphate, a faujasite (FAU), a mordenite (MOR), a ZSM-5 (MFI), a CHA, or any combination thereof.

29. The method of claim 28 wherein the mesopores within the mesostructure have a [MCM-41], [MCM-48], [MCM-50], or [SBA-15] pore arrangement.

30. The method of claim 1, wherein the mesopores have the hexagonal pore arrangement of MCM-41, the cubic pore arrangement of MCM-48, the lamellar pore arrangement of MCM-50, or the hexagonal pore arrangement of [SBA-015].

31. The method of claim 1, wherein the mesopores are organized in a foam arrangement.

32. The method of claim 1 wherein the mesostructured crystalline zeolite material comprises a hybrid one-phase mesostructured zeolitic single crystal material having long-range crystallinity and comprising a plurality of mesopores, wherein the mesostructured crystalline zeolite material exhibits XRD peaks at two theta angle degrees higher than 8.

33. The method of claim 32 wherein the mesostructured crystalline zeolite material has a mesoporous volume adsorption of at least about 0.1 cc/g.

34. The method of claim 32, wherein the mesostructured crystalline zeolite material is a faujasite.

35. The method of claim 32 wherein the mesostructured crystalline zeolite material has a mesoporous volume adsorption of at least about 0.05 cc/g.

36. A one-phase mesostructured crystalline zeolite material having long-range crystallinity formed by the process of claim 1.

37. The material of claim 36 wherein the cross-sectional area of at least a portion of the plurality of mesopores is substantially the same.

38. The method of claim 1, wherein the mesostructured crystalline zeolite material recovered in step c) has an external surface contour substantially the same as the external surface contour of the initial zeolite material provided in step a).

39. The method of claim 1, wherein the mesostructured crystalline zeolite material recovered in step c) has a chemical composition framework substantially the same as the chemical composition framework of the initial zeolite material provided in step a).

40. The method of claim 1, wherein the mesostructured crystalline material zeolite recovered in step c) has a connectivity substantially the same as the connectivity of the initial zeolite material provided in step a).

41. The method of claim 1, wherein the mesostructured crystalline zeolite material recovered in step c) has an improved intracrystalline diffusion compared to the intracrystalline diffusion of the initial zeolite material provided in step a).

42. The material of claim 36 wherein at least a portion of the plurality of mesopores have a controlled cross sectional area range.

43. The material of claim 42 wherein the controlled cross sectional area of each of the plurality of mesopores has a controlled distribution range.

44. The material of claim 42 wherein the controlled cross sectional area of each of the plurality of mesopores has a diameter and each mesopore diameter has a controlled distribution range.

45. The material of claim 42 wherein the controlled cross sectional area of each of the plurality of mesopores has a diameter and each mesopore diameter falls within a 1 nm distribution range.

46. The method of claim 1 wherein the mesopores forming the mesostructure are interconnected.

47. A method of making a single-phase mesostructured crystalline zeolite material, the method comprising:
    a) providing an initial fully crystalline zeolite material;
    b) contacting said initial zeolite material with a solution comprising at least one surfactant;
    c) contacting at least a portion of the initial zeolite material contacted with said surfactant in step b) with a pH controlling substance, wherein said pH controlling substance has a pH between about 9 and about 11; and
    d) subsequent to step c), recovering a fully crystalline single-phase mesostructured zeolite material, wherein said fully crystalline single-phase mesostructured zeolite material comprises a plurality of mesopores defined within the volume of the crystalline zeolite structure.

48. The method of claim 47, wherein said initial zeolite material is selected from the group consisting of a crystalline metal oxide, a zeolite, a zeotype, an aluminophosphate, a gallophosphate, a zincophosphate, a titanophosphate, faujasite (FAU), mordenite (MOR), ZSM-5 (MFI), CHA, and combinations thereof.

49. The method of claim 47, wherein said contacting of step c) includes washing at least a portion of said zeolite material contacted with said surfactant in step b) with water.

50. The method of claim 47, wherein said pH controlling agent is selected from the group consisting of alkali hydroxides, alkaline earth hydroxides, ammonium hydroxide, tetralkylammonium hydroxide, and combinations thereof.

51. The method of claim 47, wherein said mesostructured crystalline zeolite material has a mesopore volume of at least 0.05 cc/g.

52. The method of claim 47, wherein at least a portion of said mesopores have an average wall thickness in the range of from about 1 to about 5 nm.

53. The method of claim 47, wherein each of said mesopores has a mesopore diameter falling within a distribution range of about 1 nm and wherein at least a portion of said mesopores have an average mesopore diameter in the range of from about 2 nm to about 5 nm.

54. The method of claim 47, wherein one or more of the mesopores intersect, interconnect, and/or converge with one or more other mesopores within the crystalline zeolite structure.

55. The method of claim 47, wherein said recovering includes calcining said single-phase mesostructured crystalline zeolite material in the presence of air or nitrogen at a temperature in the range of from about 500° to about 600° C.

56. The method of claim 47, further comprising anchoring at least one chemical species and/or at least one homogenous catalyst onto at least a portion of the single-phase mesostructured crystalline zeolite material recovered in step d).

* * * * *